Nov. 1, 1949 — A. M. ROSSMAN — 2,486,982
PNEUMATIC POWER UNIT
Filed Aug. 17, 1942 — 16 Sheets-Sheet 2
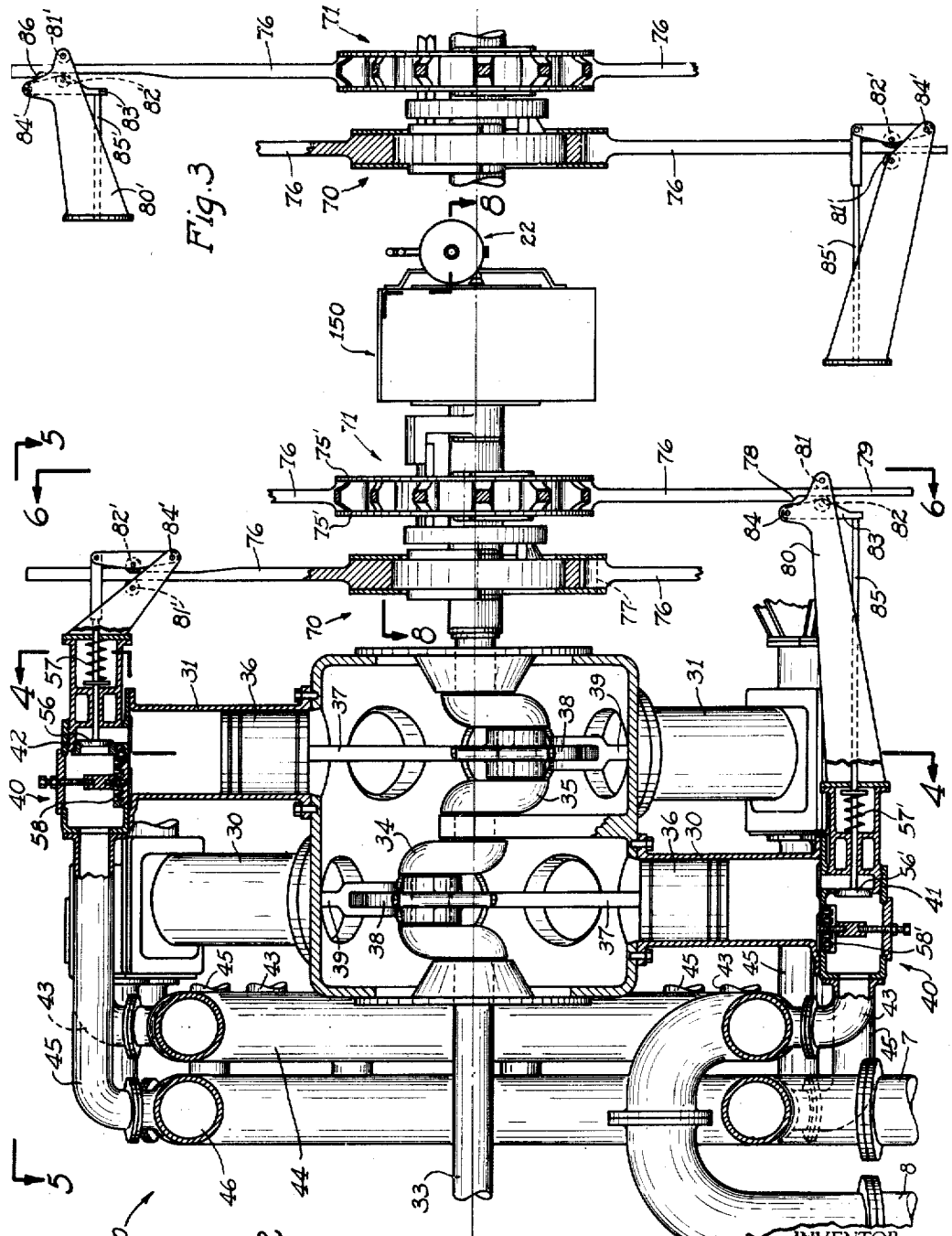

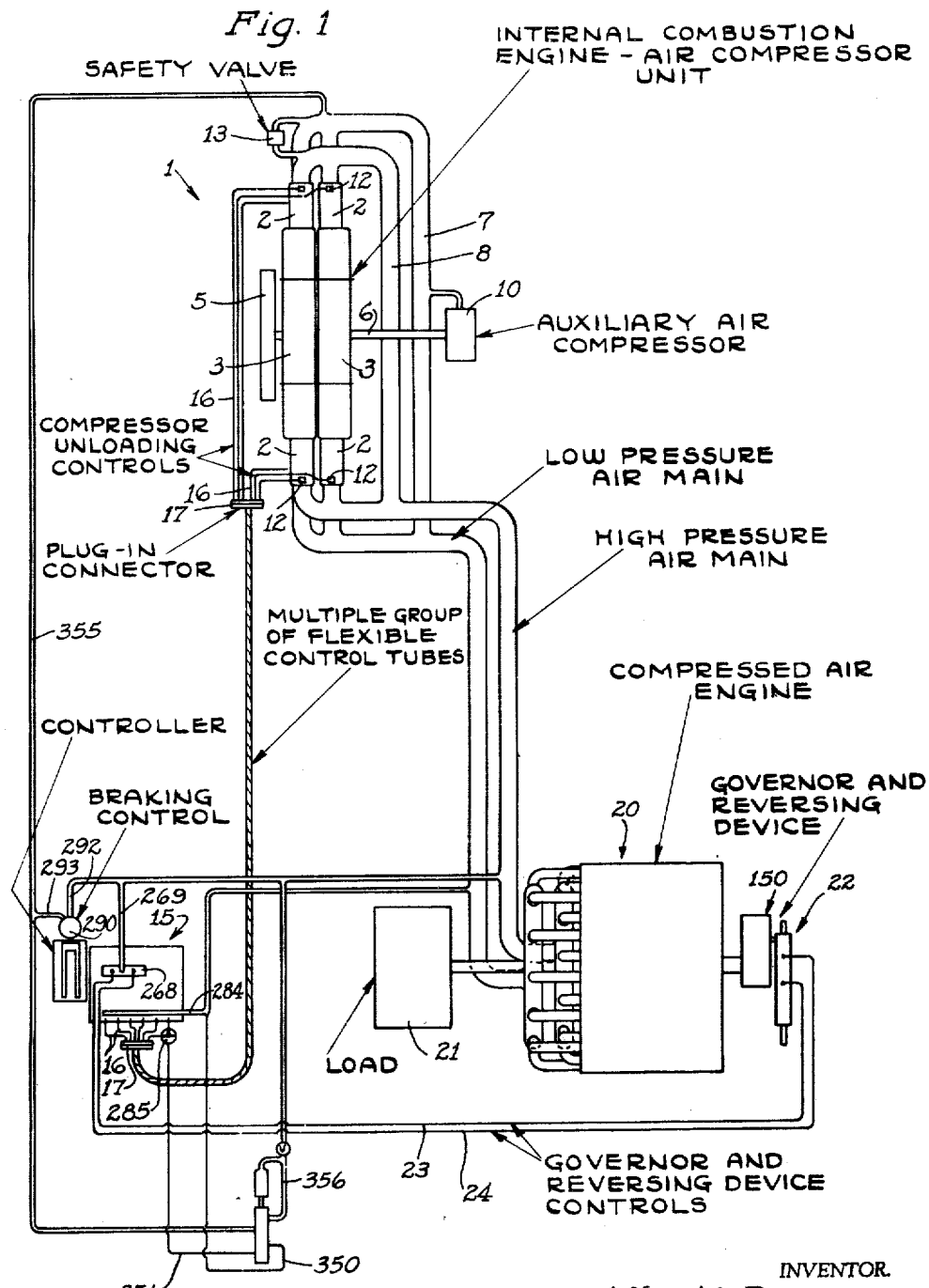

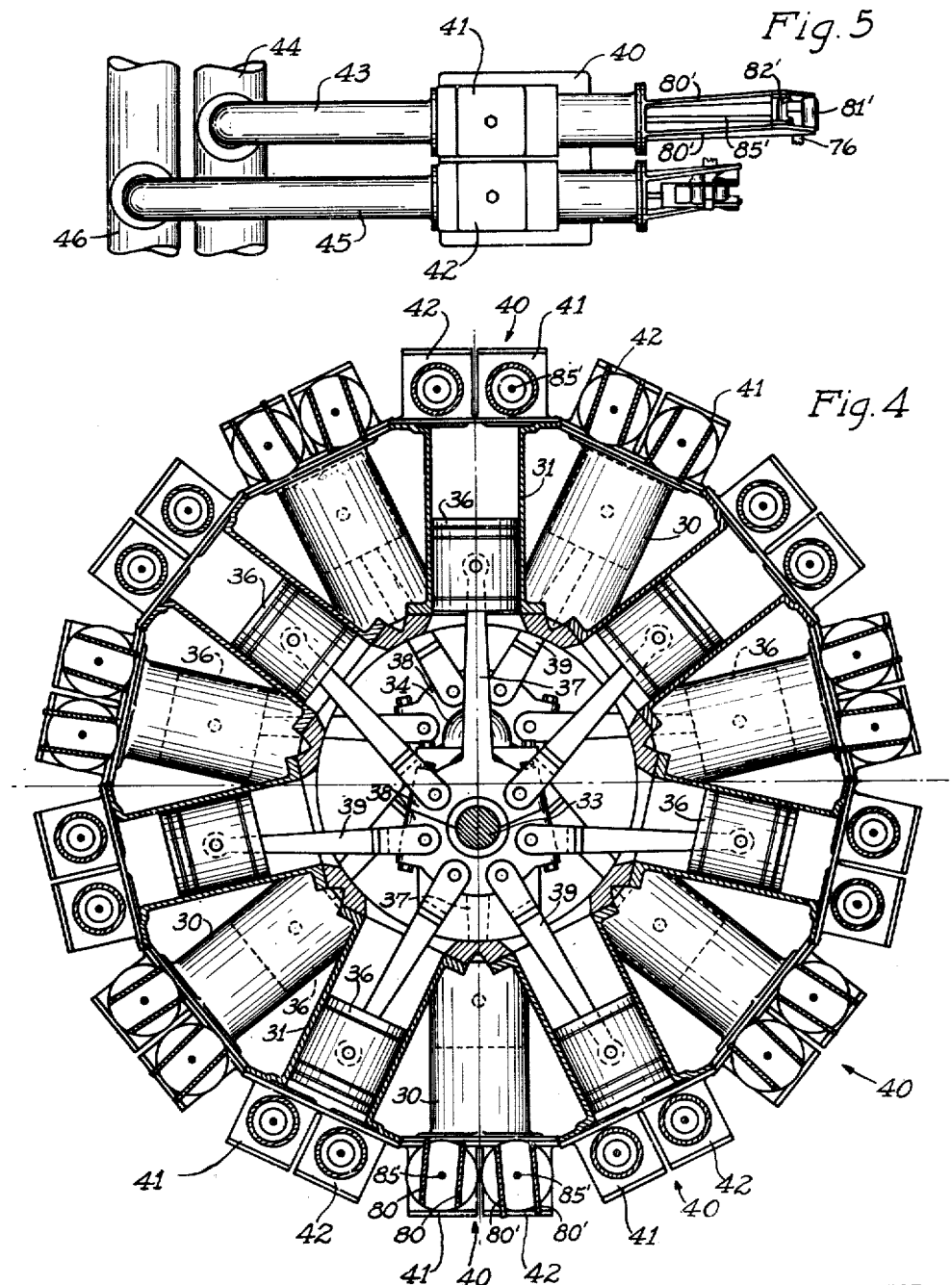

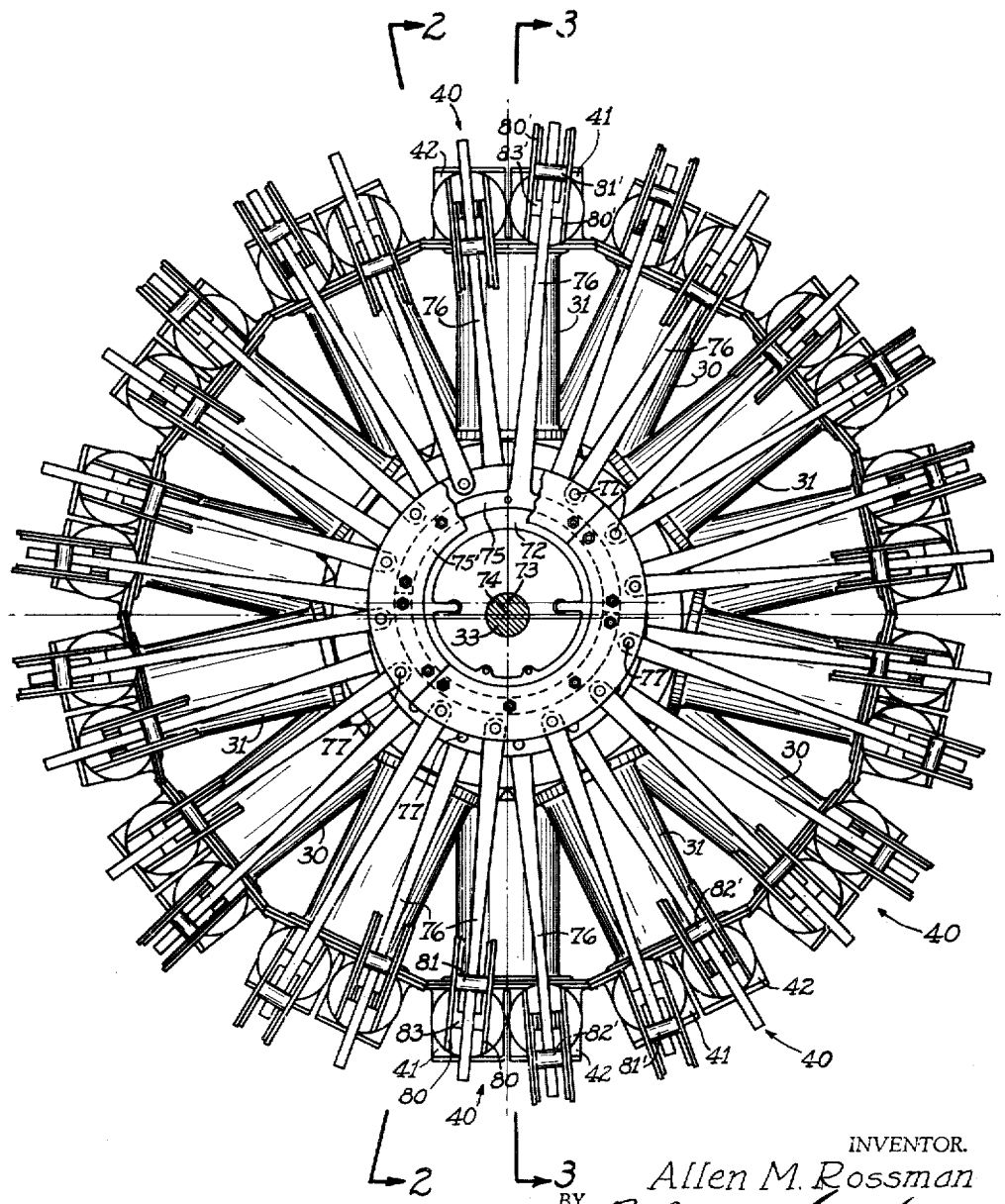

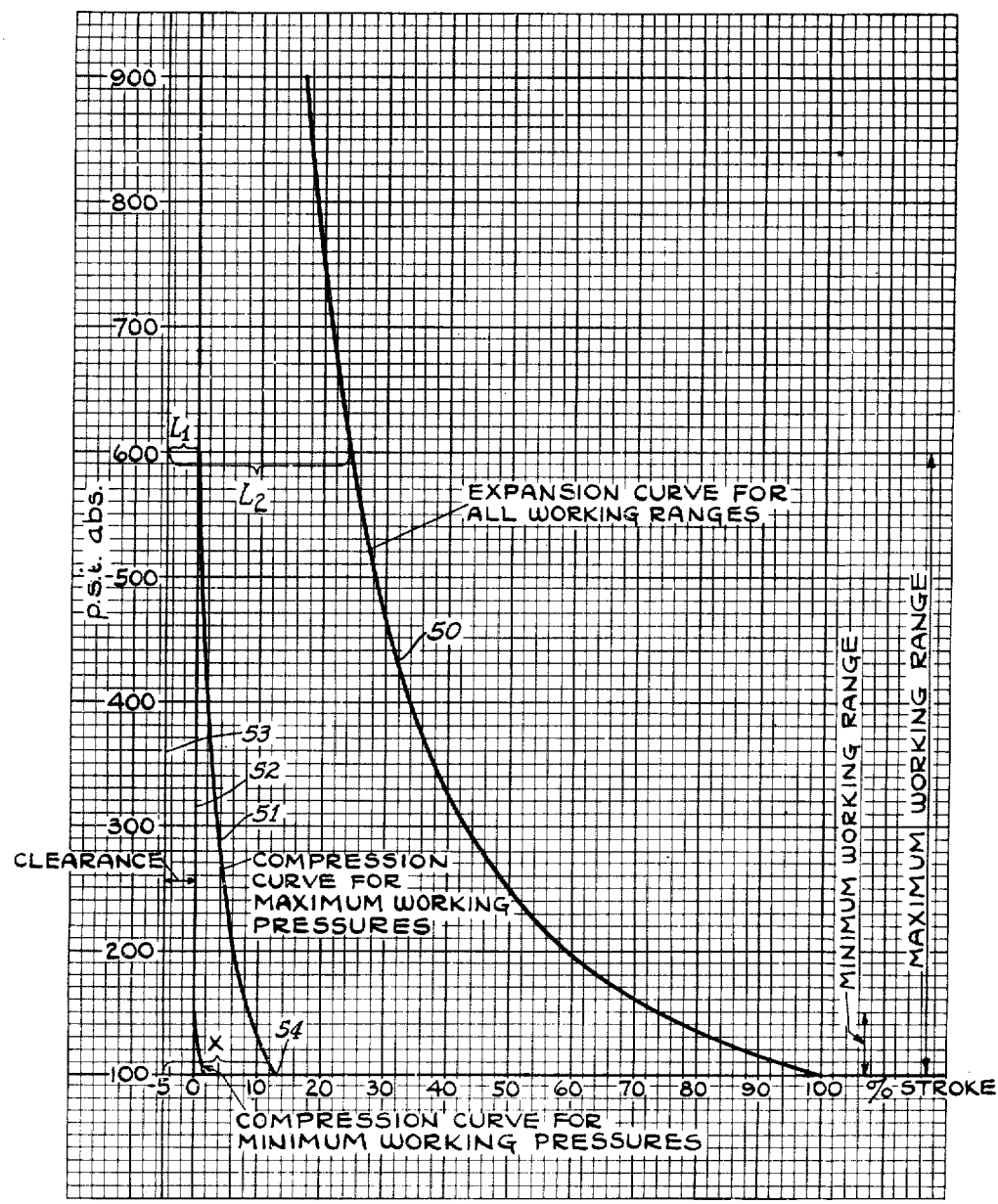

Nov. 1, 1949     A. M. ROSSMAN     2,486,982
PNEUMATIC POWER UNIT
Filed Aug. 17, 1942     16 Sheets-Sheet 6
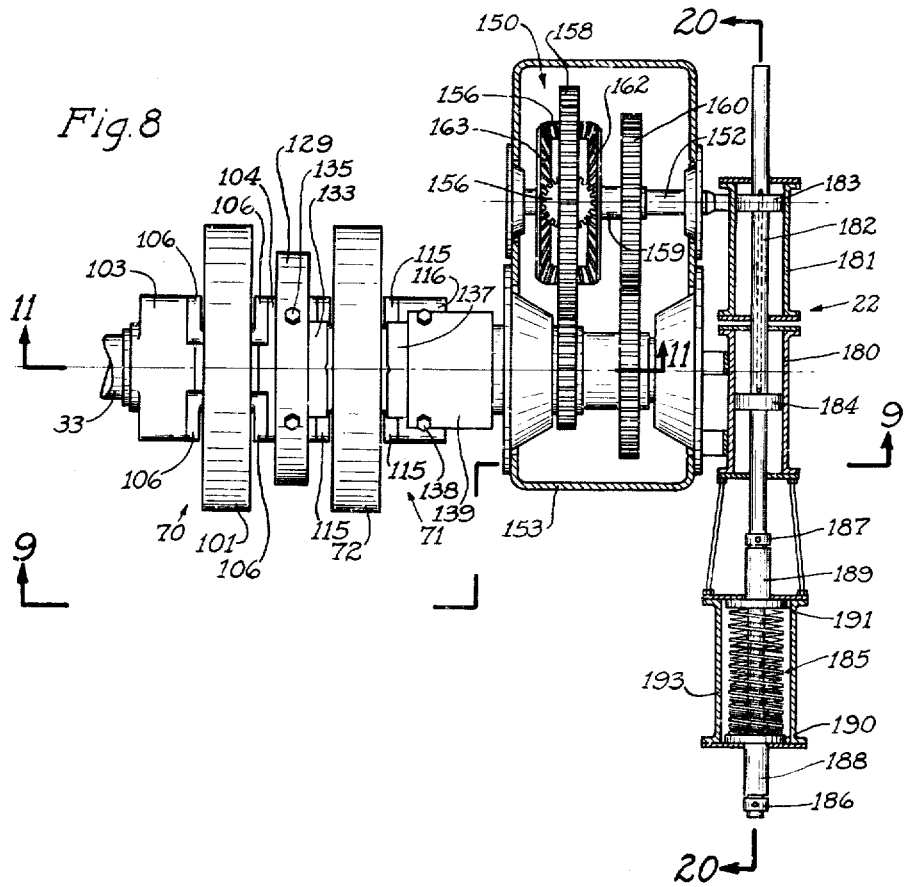
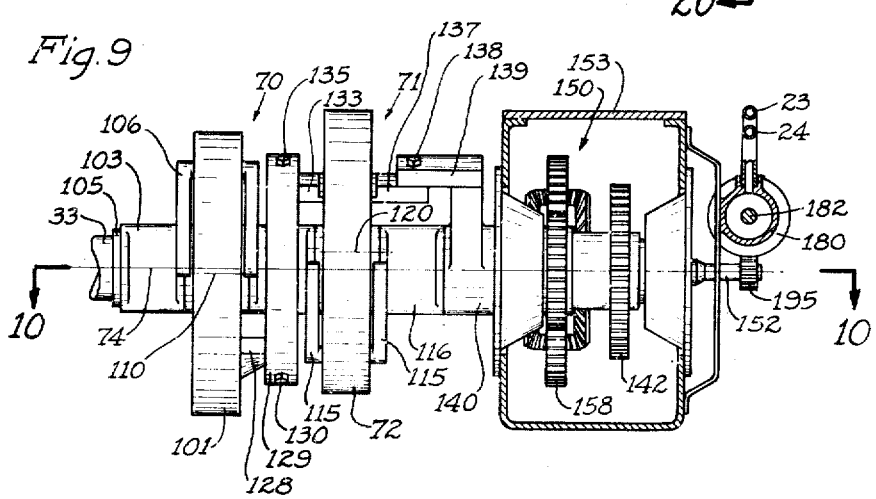
INVENTOR.
Allen M. Rossman
BY Morris Spector Nov. 1, 1949  A. M. ROSSMAN  2,486,982
PNEUMATIC POWER UNIT
Filed Aug. 17, 1942  16 Sheets-Sheet 7
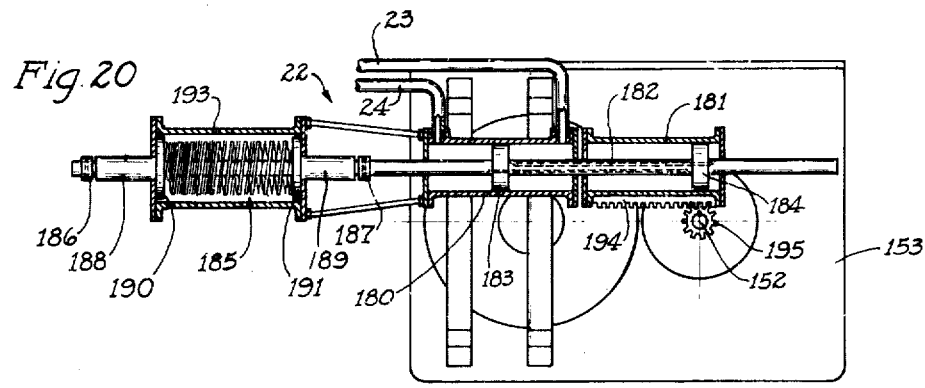
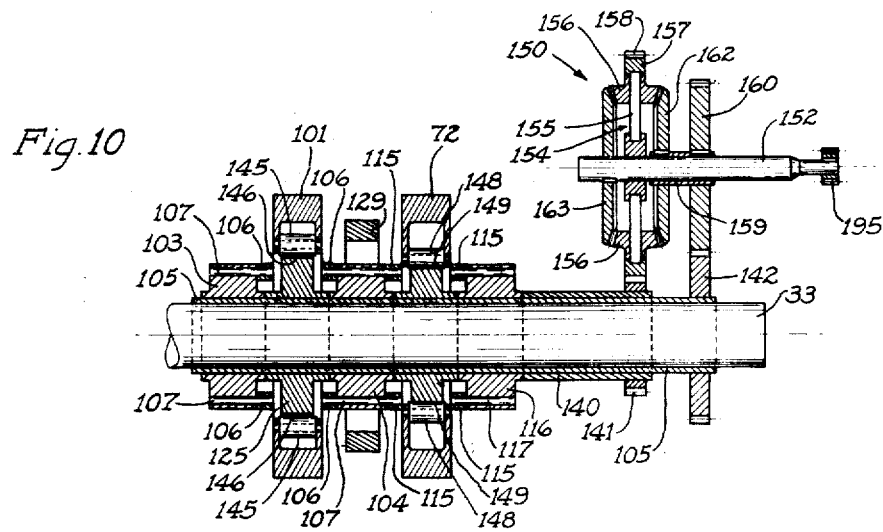
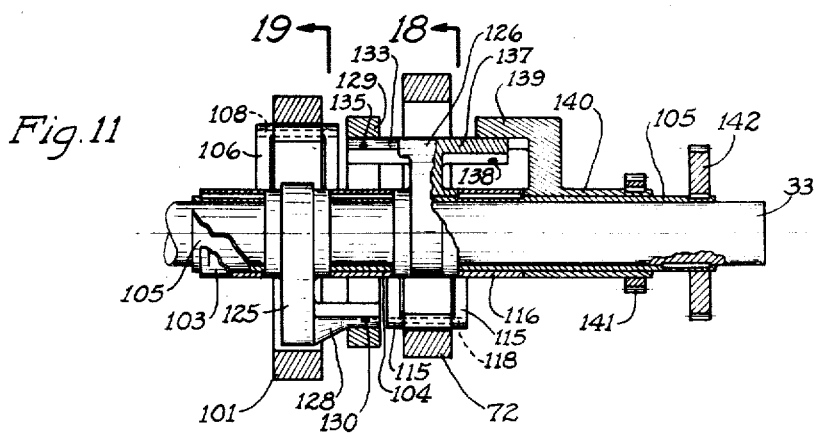
INVENTOR.
Allen M. Rossman
BY Morris Spector

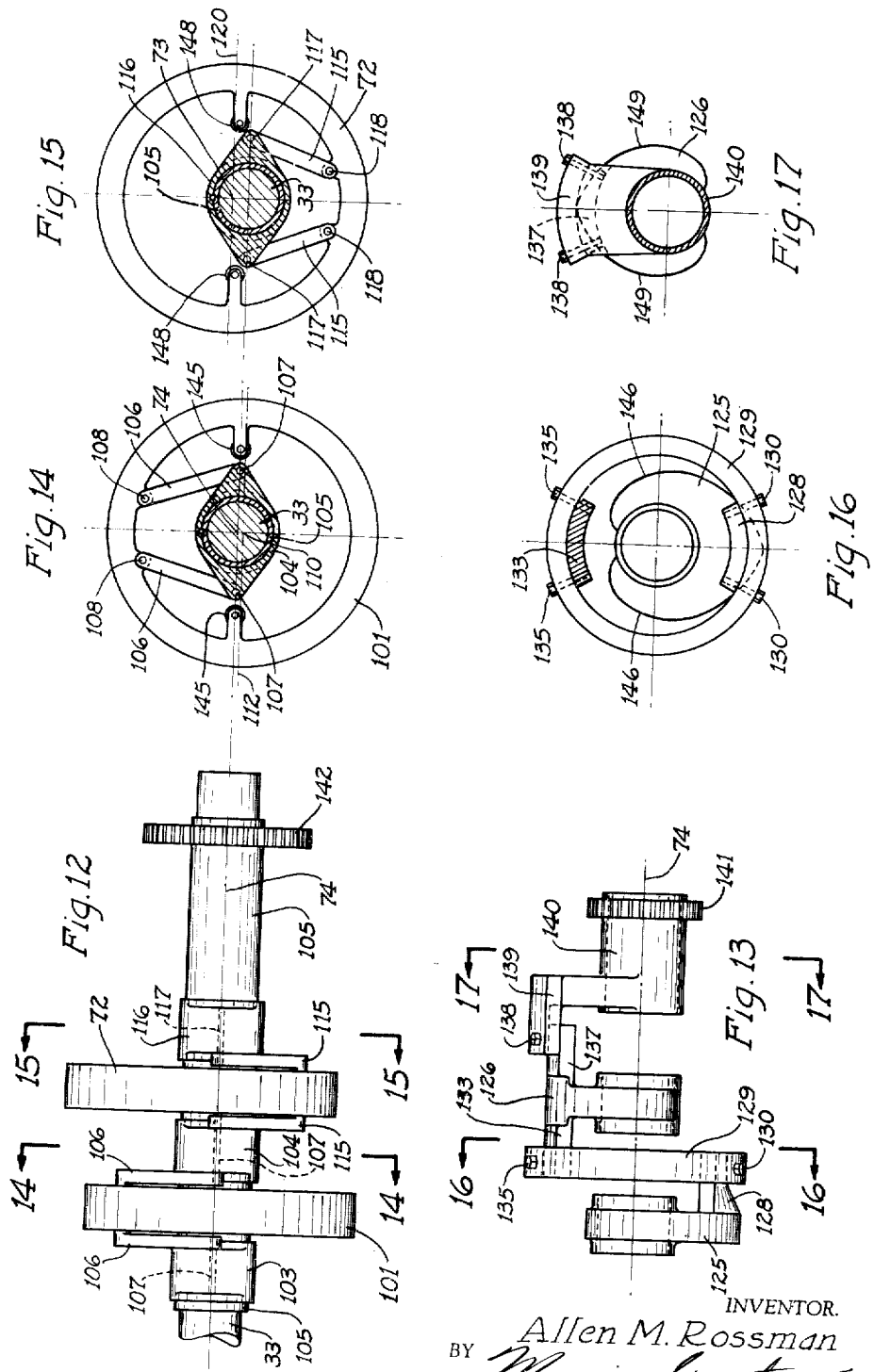

Nov. 1, 1949  A. M. ROSSMAN  2,486,982
PNEUMATIC POWER UNIT
Filed Aug. 17, 1942  16 Sheets-Sheet 9

INVENTOR.
Allen M. Rossman
BY Morris Spector

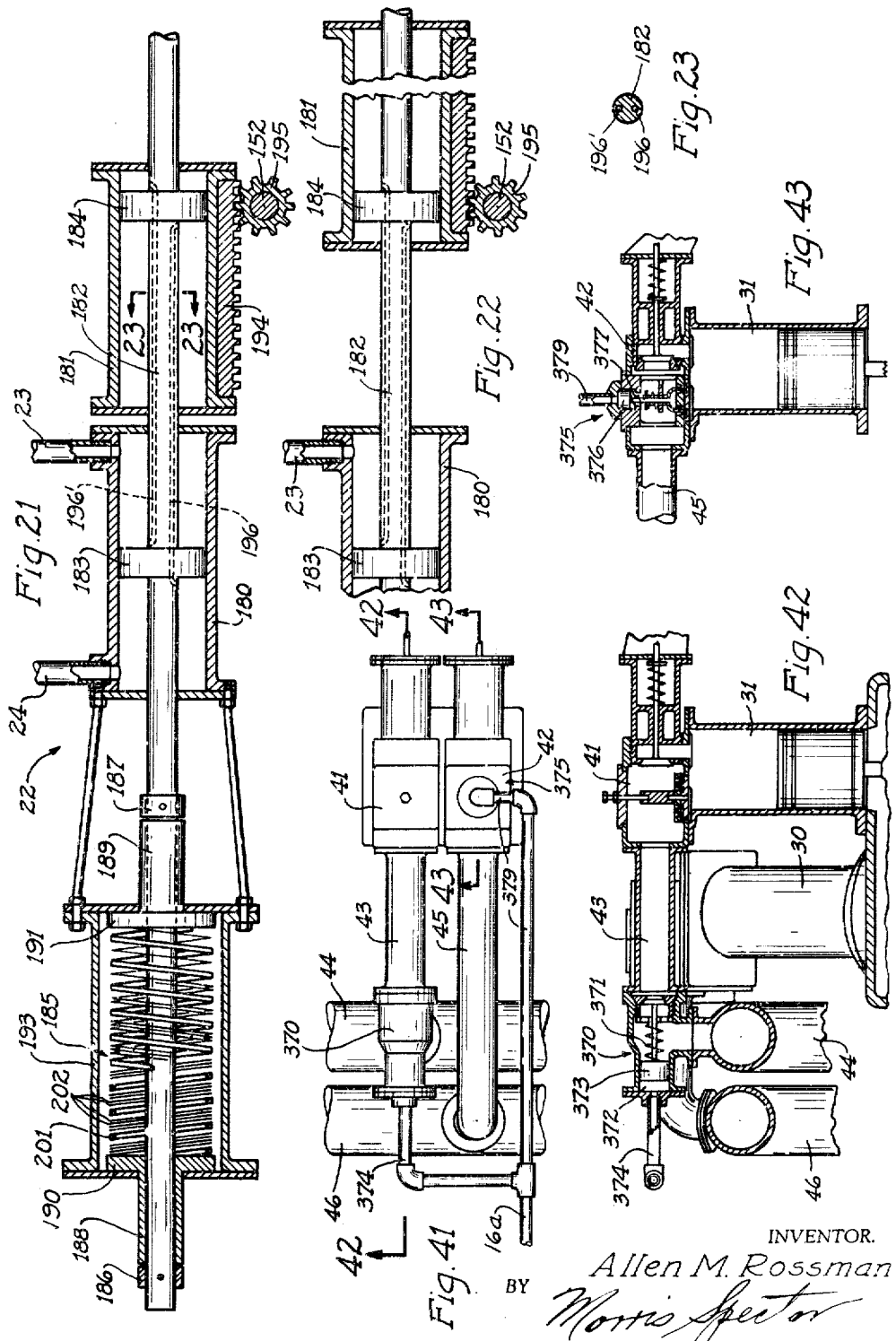

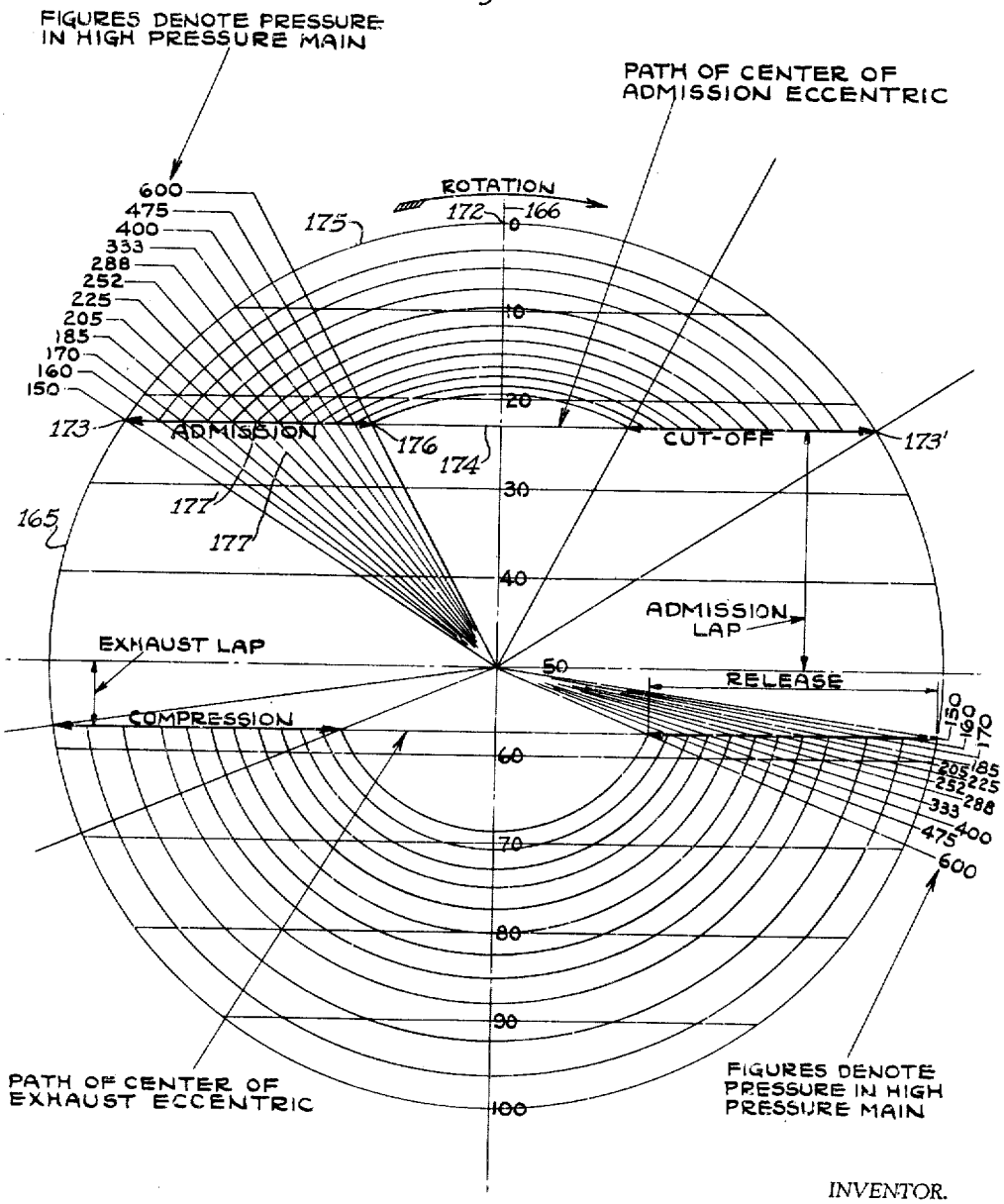

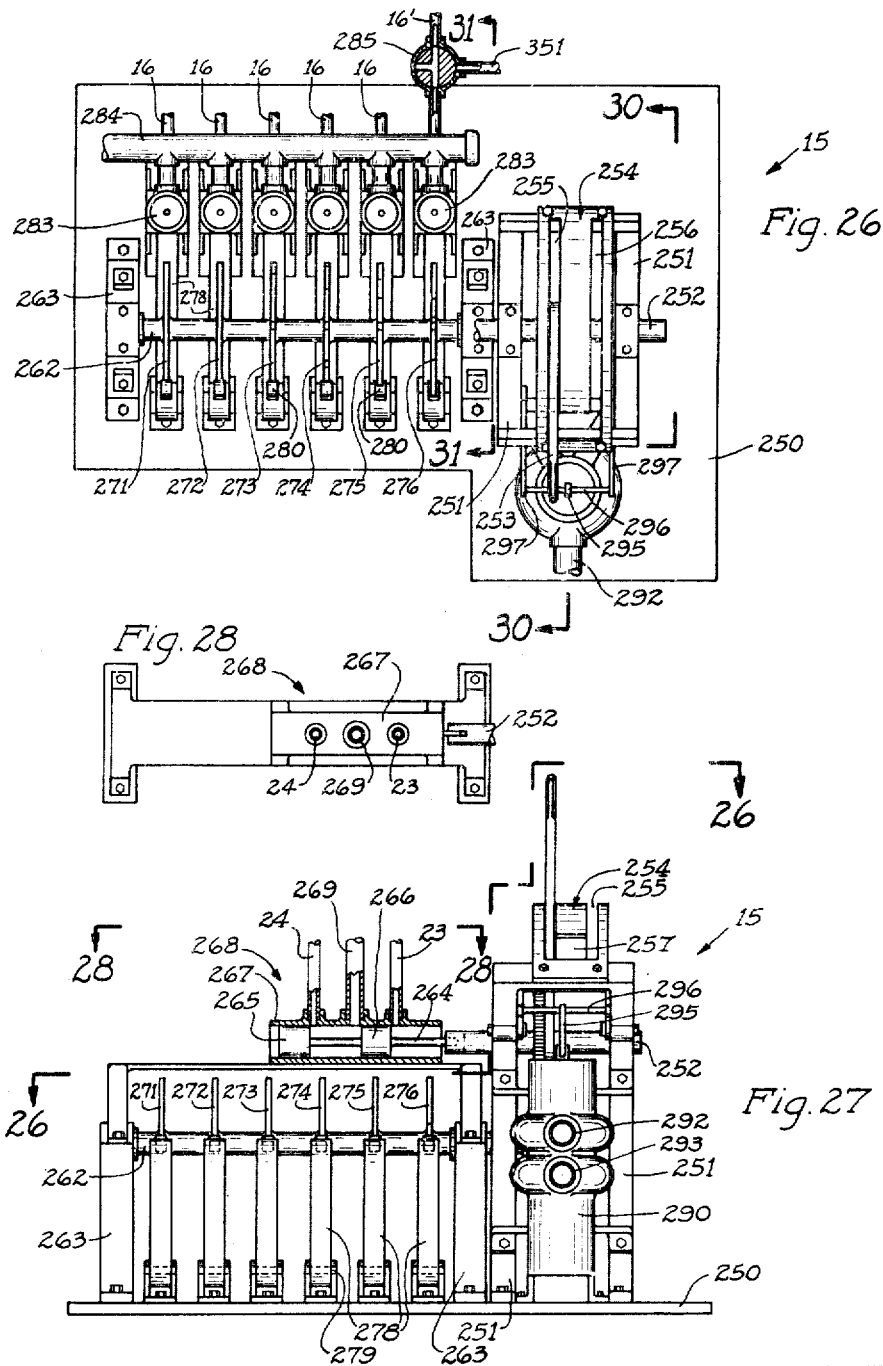

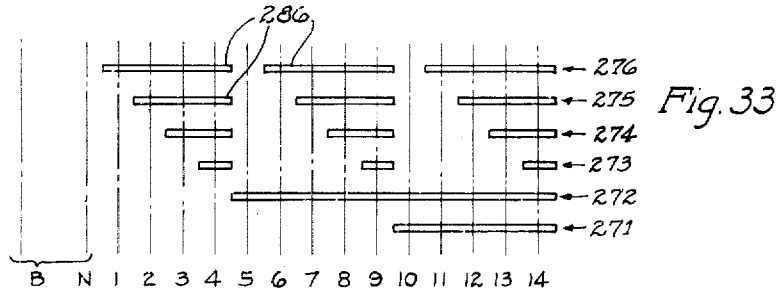
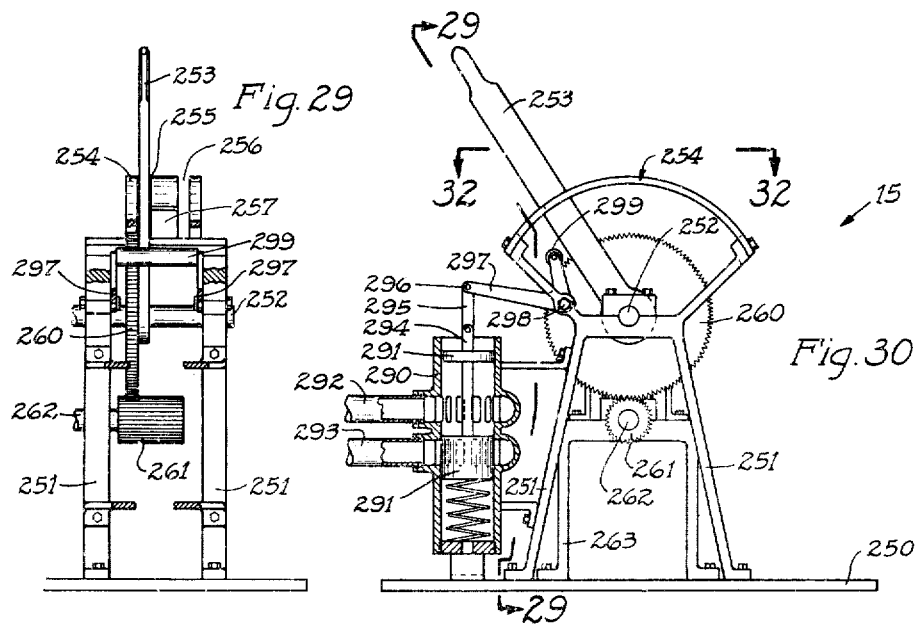
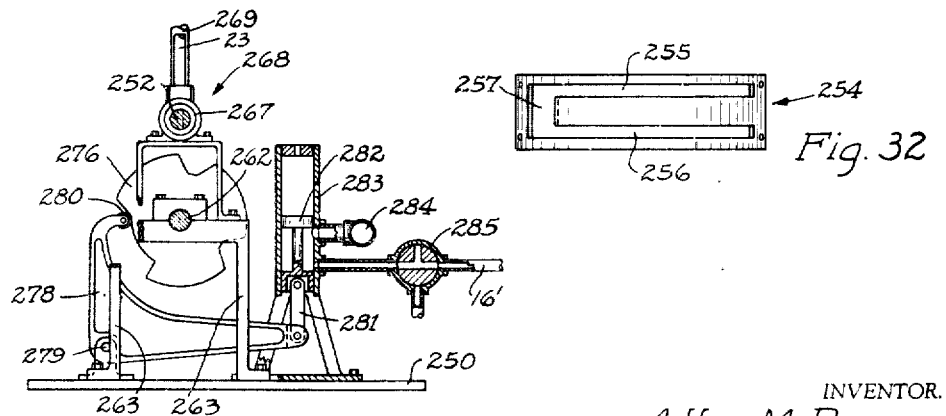

Nov. 1, 1949  A. M. ROSSMAN  2,486,982
PNEUMATIC POWER UNIT
Filed Aug. 17, 1942                      16 Sheets-Sheet 15
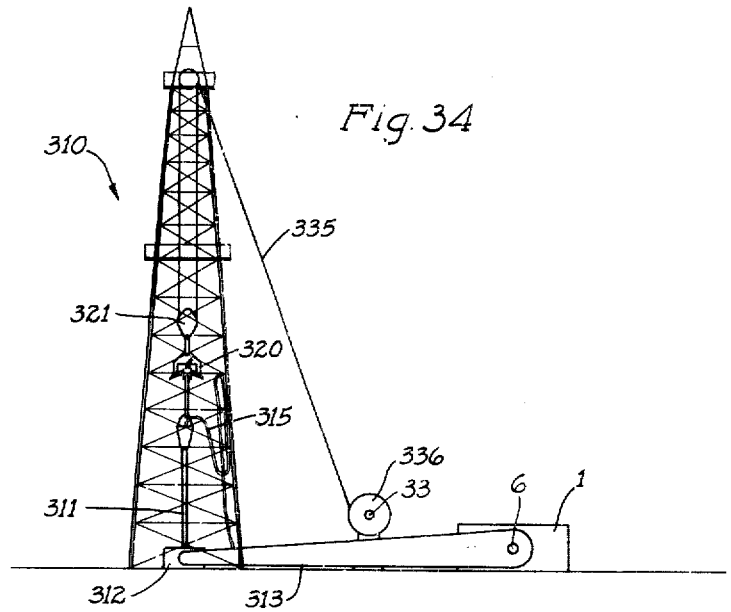
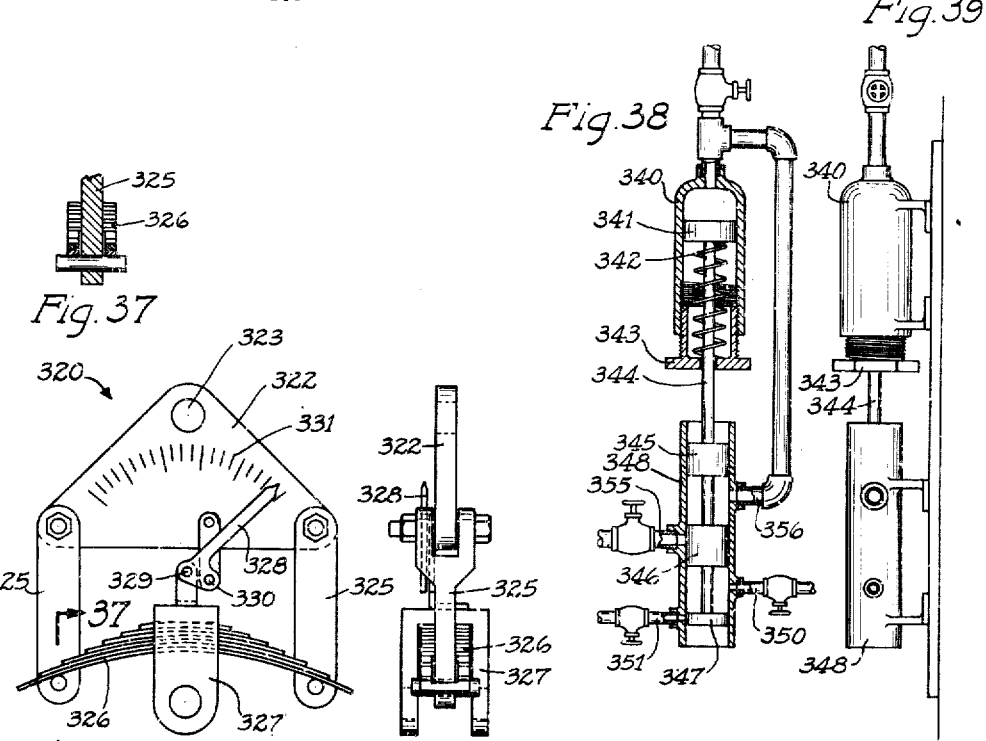
INVENTOR.
Allen M. Rossman
BY Morris Spector Nov. 1, 1949     A. M. ROSSMAN     2,486,982
PNEUMATIC POWER UNIT
Filed Aug. 17, 1942     16 Sheets-Sheet 16
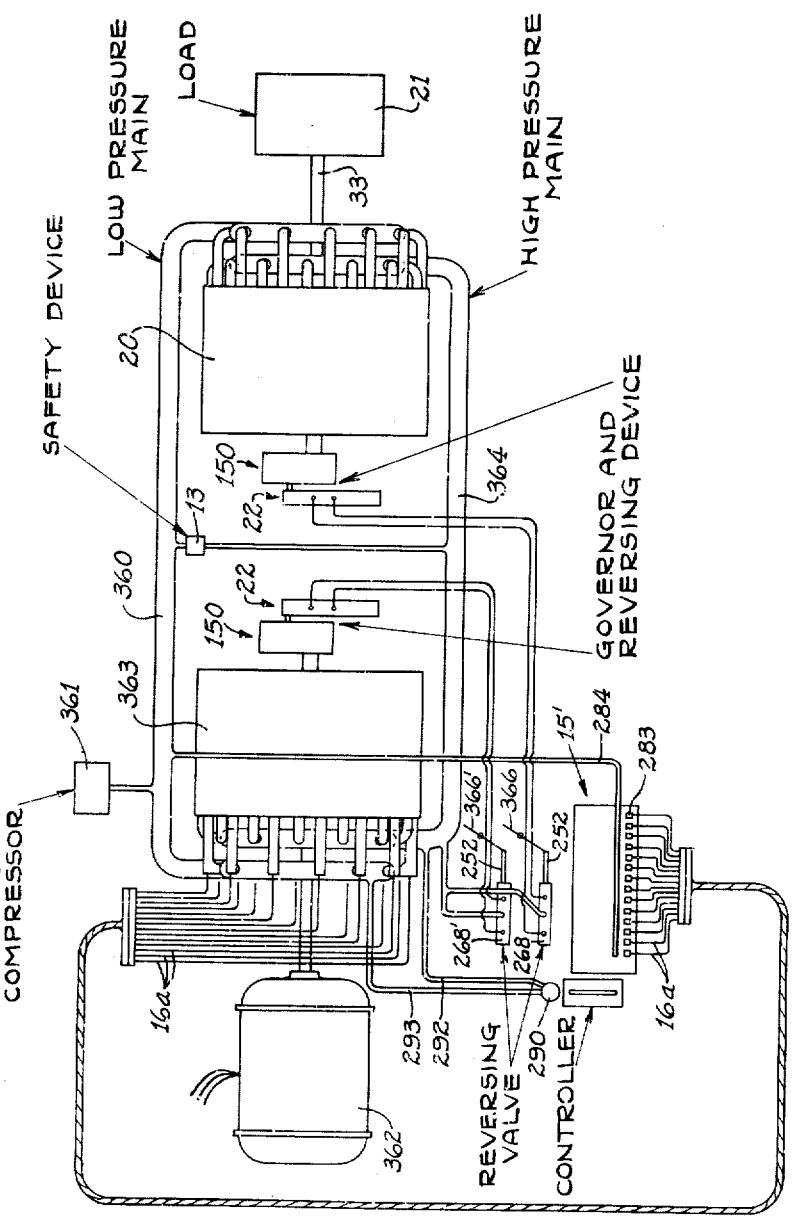
INVENTOR.
Allen M. Rossman
BY Morris Spector Patented Nov. 1, 1949

2,486,982

UNITED STATES PATENT OFFICE 2,486,982

PNEUMATIC POWER UNIT

Allen M. Rossman, Wilmette, Ill.

Application August 17, 1942, Serial No. 455,151

14 Claims. (Cl. 60—62)

This invention relates to power transmission systems and to equipment and machinery for such systems. While the system of the present invention is here illustrated as applied to an oil well drilling rig, it is to be understood that the invention is not limited thereto, the same being illustrative of one of the uses of this system.

In accordance with the preferred embodiment of the present invention the power system employs two main units, namely, an air compressor, and a compressed air engine, connected together by a high pressure main and a low pressure main. The air pressure system is a closed system operating between a low pressure which is preferably maintained constant, and a variable high pressure. The high pressure is maintained by an engine or other device which operates to deliver air to the high pressure main in such volume and at such pressures as the load demands. The pressure in the low pressure main is preferably kept at a constant value of several atmospheres, by an auxiliary compressor.

The air engine of the present invention takes air from a high pressure main at some pressure between fixed limits, which may be of the order of 150 pounds per square inch absolute to 600 pounds per square inch absolute, and exhausts it into a low pressure main at a constant pressure of, say, 100 pounds per square inch absolute.

As a result of the maintenance of an elevated pressure in the low pressure main the piston displacements of the air compressor and of the air motor may be greatly reduced. The reason for this is that for a given rating of power, speed and expansion ratio, the piston displacements vary inversely with the pressure in the low pressure main. For example, for absolute pressures in the low pressure main of 15 pounds per square inch and 100 pounds per square inch respectively, the corresponding piston displacements bear a ratio to each other of 100 to 15, respectively.

It is one of the objects of the present invention to provide a system of the above mentioned character wherein the air engine is located comparatively close to the compressor to enable it to take advantage of the rise in temperature of the air as it is compressed. In accordance with one of the features of the present invention the engine is so designed that an indicator diagram taken from any of its cylinders when the engine is operating at any load will be a close approximation of a diagram taken simultaneously from the air compressor. While the equipment is operating in this manner thermo-dynamic losses will be small because nearly all of the energy that is put into the air by the compressor, partly in the form of an increase in pressure and partly in the form of an increase of temperature, is recovered in the engine. Maximum and minimum designed pressure limits can be so chosen that maximum temperatures can be limited. With an initial temperature of 60° F. and a pressure range from 100 p. s. i. absolute to 600 p. s. i. absolute the temperature range under adiabatic conditions will be from 60° F. to 410° F. With temperatures of this order and with insulation judiciously applied, radiation losses can be kept low. There will be little tendency for a cumulative increase in the temperature of the air. Hence water jacketing of the cylinders is not required on either the compressor unit or the air engine unit.

The system of the present invention may use any multi-cylinder type of air compressor, the compressor being driven in any desired manner as, for instance, by an internal combustion engine or by an electric motor. The air intake valves of the air compressor are spring seated. Each air intake valve is provided with an unloading device which is pneumatically actuated to move the valve to its open position and to hold it in that position, so that reciprocation of the piston in that cylinder will result in no compression of the air therein, that piston merely idling.

When the load is at rest the air compressor is idled under control of its unloading devices. To start the load the unloading devices are progressively released, thus progressively bringing the compressor cylinders into action and gradually building up the pressure in the high pressure main. After the load has been started the pressure in the high pressure main is set to give the desired load speed. This may be done by manipulation of the unloading devices and, to some extent, if desired, by regulating the speed of the compressor. To reduce the load speed this process is reversed. During this speed cycle a governor is automatically at work on the compressed air engine making continuous adjustments of the cut-offs of both the admission valves and the exhaust valves to the end that an indicator diagram taken from any one of the engine cylinders may duplicate as closely as possible an indicator diagram taken simultaneously from a cylinder of the air compressor.

The method of control above described is based upon the following principles:

1. The torque developed by the air engine is a direct and proportionate function of the mean effective pressure in its cylinders.

2. The mean effective pressure in the air engine cylinders is a direct, but not proportionate, function of the pressure in the high pressure main.

It follows from the above principles that there must be a value of pressure in the high pressure main that gives a mean effective pressure in the cylinders of the air engine that just balances the torque of the load. Any pressure above this value will cause the air engine to accelerate the load. Any pressure below this value will cause a load, such as a suspended weight, to drive the engine backward and thereby make the air engine function as an air compressor to brake the load. It is one of the objects of the present invention to provide a system wherein the mean effective pressure in the engine cylinders may be varied at will in order to make the air motor function in different manners as may be required for different operating conditions.

During the drilling of a deep oil well it is desirable that the weight or pressure exerted by the drill against the bottom of the hole in the ground formed thereby shall be maintained substantially constant. As the depth of the hole increases during drilling operations, the weight of the length of the drill pipe from the bottom of the hole to the top of the well increases. It is necessary that this increased weight shall not exert all of its pressure on the drill bit at the bottom of the hole. It is one of the objects of the present invention to provide a system wherein the compressed air engine that is used to furnish the power for raising or lowering the drill pipe may be used also, during the drilling operations, to hold a predetermined value of weight on the drill bit. During drilling, the air engine is set to exert a force tending to raise the string of pipe leading to the drill bit, but the air pressure is maintained at a value below that necessary to cause the engine to raise the pipe. If the torque exerted by the engine is maintained at a constant value it will allow a predetermined value of weight to be exerted on the drill bit. As the depth of the hole is appreciably increased, the pressure in the high pressure main is adjusted to a new value again to maintain a predetermined value of weight on the drill bit.

It is a further object of the present invention to provide an automatic mechanism for maintaining the pressure in the high pressure main at a predetermined set value during the drilling operations. It is a still further object of the present invention to provide such a mechanism which may be readily and quickly adjusted for maintaining different fixed values of pressure in the high pressure main, as may become necessary by the increase in length of the drill pipe during the drilling operation. It is a still further object of the present invention to provide a deep well drilling system with a device for indicating the amount of pull exerted by the engine on the travelling block that supports the drill pipe.

In accordance with one of the principles of the present invention the device for governing the air pressure in the high pressure main for maintaining a substantially constant weight on the drill bit is in the form of a relay which responds to the pressure in the high pressure main and builds up that pressure by releasing the unloading device on one or more cylinders of the air compressor when the pressure in the high pressure main is too low. On the other hand, should the pressure in the high pressure main become too high the relay will shunt part of the air from the high pressure main into the low pressure main.

It is a still further object of the present invention to provide a power system with a controller so arranged that an air engine which drives the load may be used to brake the load in either direction of travel. While braking, the engine functions as an air compressor taking air from the low pressure main and discharging it into the high pressure main. It is another object of the present invention to provide a controller which not only controls the speed of operation of the engine but also controls the braking effort, regulating it to any desired value and for any speed within the designed limits.

When the engine is delivering power, the exhaust valve must open at the end of the power stroke and remain open during the major part of the subsequent return or exhaust stroke. Prior to the completion of that return stroke, the exhaust valve must close so that the air remaining in the cylinder is compressed to a pressure equal to that of the high pressure main, at which time the inlet valve is to open. An examination of adiabatic compression curves of air shows that because of the steepness of the slope of the curve it is impractical to make a mechanical valve setting close enough to effect opening of the inlet valve within the limits that appear desirable. To solve this problem, and for additional reasons, the engine is provided with two sets of inlet valves. One set is of the mushroom type, mechanically operated. The other set is of an automatically operated type that is spring closed when the pressure in the engine cylinder is below that of the high pressure main, and automatically opened by reversal of air pressure. This assures an opening of the high pressure air inlet valve at exactly the right time in the operation of the engine. The exhaust or outlet of each cylinder of the engine is also provided with an automatic valve which is spring closed and automatically opens when the pressure within the cylinder drops below that in the low pressure main, and with another valve also spring seated but mechanically opened for also controlling communication between the engine cylinder and the low pressure main. With this combination of valves, settings of the mechanically operated valves are so made that when the engine is hoisting, or driving its load, as the piston approaches the end of each stroke, either outwardly or inwardly, events will take place in the following sequence:

1. The automatic valve opens as soon as the pressure within the cylinder equals the pressure in the corresponding air main, and before the operation of the corresponding mechanical valve. This immediately equalizes the pressure on opposite faces of the corresponding mechanically operated valve.

2. The mechanically operated valve then opens.

3. The automatic valve then immediately closes but communication with the corresponding port is maintained by the mechanical valve and until the mechanical valve closes.

The mechanically operated admission valves and exhaust valves are operated by separate eccentrics. The governing action is obtained by moving the center of the eccentric with respect to the center of the operating shaft in a straight line at right angles to the crank, thus altering the eccentricity but keeping the lead constant. It is one of the objects of the present invention to provide an improved mounting for the eccentric on the drive shaft so that the eccentric center may be moved in a straight line. This is accomplished by mounting the eccentric ring on the shaft by means of a linkage which permits movement of the center of the eccentric ring with respect to the center of the shaft only in a straight line, and by providing a cam for effecting that movement. Ordinarily the cam and the eccentric ring move together with the drive shaft so that during the ordinary operation of the engine there is no relative movement between the eccentric ring and the cam. To shift the center of the eccentric ring with respect to the center of the shaft, the cam and the drive shaft are turned with respect to one another.

It is a still further object of the present invention to provide a mechanism for effecting relative motion between the eccentric ring and the cam that shifts the position of the eccentric ring with respect to the drive shaft while the drive shaft and the eccentric rings are in motion. It is another object of the present invention to provide a governor for governing the position of the center of the eccentric with respect to the drive shaft. The governor is actuated by pressure in the high pressure main and thus regulates the position of the center of the eccentric ring in accordance with changes in pressure in the high pressure main to maintain the action of the valves such that the expansion of the air in the air engine during the power stroke will be such that the pressure in the cylinder reaches its minimum value equal to the pressure in the low pressure main as the piston reaches the end of its power stroke.

It is a still further object of the present invention to provide a governing device of the above mentioned character which may be combined with a reversing device to set the engine valves for operation in either direction.

As the engine torque is increased, increments of air pressure increase at a faster rate than corresponding increments of torque. Compensation for this disproportion can be made in accordance with the present invention by incorporating in the governor design, a spring so proportioned that it will develop progressively increasing increments of counter-pressure, at the rate required to supply the proper degree of compensation.

It is a still further object of the present invention to provide a controller which can act through the reversing and governing mechanism to fix the direction of rotation of the air engine and which will also control the operation of the unloading devices on the air compressor in proper sequence and in such manner as to obtain the desired torque and speed from the engine; to change the function of the engine from motoring to braking; and to control the magnitude of the braking torque and hence the speed of the engine. It is a still further object of the present invention to provide a controller wherein the control of all of these functions is centered in a single operating lever, the position of which determines the function to be performed, and which may be moved to its various positions either by hand or by foot.

It is a further object of the present invention to provide an electropneumatic power system arranged to afford regenerative braking. The high pressure sides of two engines are connected together by the high pressure main and the low pressure sides of the engines are connected together by the low pressure main. One of the engines is connected to operate the load whereas the other engine is connected to be driven by (or drive during braking) a constant speed alternating current motor. While the load is being driven the alternating current motor driven pneumatic unit operates as a compressor furnishing air to the other unit operating as a motor. During braking the functions of the two units are reversed so that the one connected to the alternating current motor drives the motor to feed energy back into the line. The electric driven unit is provided with pneumatically controlled unloading devices which are controlled by the manual controller to vary the output of the unit and thus vary the pressure in the high pressure main.

The attainment of the above and further objects of the present invention will be apparent from the following specification taken in conjunction with the accompanying drawings forming a part thereof.

In the drawings:

Figure 1 is a diagrammatic view of a power system embodying the principles of the present invention;

Figure 2 is a cross section through the compressed air engine of Figure 1, said view being taken along the line 2—2 of Figure 6;

Figure 3 is a view of a portion of the eccentric and valve rod structure of Figure 2 and showing parts of the valve rods that are omitted from Figure 2, said view being taken along the line 3—3 of Figure 6;

Figure 4 is a sectional view of the engine, said view being taken along the line 4—4 of Figure 2;

Figure 5 is a top view of a part of the compressed air engine of Figure 1, said view being taken along the line 5—5 of Figure 2 and looking in the direction of the arrows;

Figure 6 is a sectional view taken along the line 6—6 of Figure 2 and looking in the direction of the arrows;

Figure 7 shows adiabatic curves for air compression and expansion in the cylinders of the engine of Figure 2;

Figure 8 is a plan view of the valve operating eccentrics and of the actuating mechanism therefor, shown partially in section, said view being taken along the line 8—8 of Figure 2, with the cam operating rods omitted;

Figure 9 is a side elevation, in partial section, of the structure of Figure 8, said view being taken along the line 9—9 of Figure 8;

Figure 10 is a sectional view taken along the line 10—10 of Figure 9 and looking in the direction of the arrows;

Figure 11 is a sectional view taken along the line 11—11 of Figure 8 and looking in the direction of the arrows;

Figure 12 is a side elevational view of the eccentric rings, and the ring supports that are keyed to the main shaft;

Figure 13 is a side elevational view of the cams for adjusting the eccentric rings, and of the structure associated with the cams for securing the cams together;

Figure 14 is a sectional view taken along the line 14—14 of Figure 12 and showing the low pressure valve rod eccentric ring and the means for mounting the same;

Figure 15 is a sectional view taken along the line 15—15 of Figure 12 and showing the high pressure valve rod eccentric ring and the manner of mounting the same;

Figure 16 is a sectional view taken along the line 16—16 of Figure 13 and showing the cam for adjusting the low pressure valve rod eccentric ring;

Figure 17 is a sectional view taken along the line 17—17 of Figure 13 and showing the cam for adjusting the high pressure valve rod eccentric ring;

Figure 20 is a view taken along the line 20—20 of Figure 8 and looking in the direction of the arrows;

Figure 21 is an enlarged view of the reversing cylinder, governing cylinder and governing spring of Figure 20;

Figure 22 is a view of a portion of Figure 21 and showing the reversing cylinder in an alternate position;

Figure 23 is a sectional view taken along the line 23—23 of Figure 21;

Figure 25 is an enlarged and more complete view of a portion of the valve diagram of Figure 24;

Figure 26 is a plan view of the controller for the system of Figure 1, the pilot valve for the reversing mechanism being omitted, said view being taken along the line 26—26 of Figure 27;

Figure 27 is a front view of the controller of Figure 26, with the reversing pilot valve shown in section;

Figure 28 is a top view of the reversing pilot valve, said view being taken along the line 28—28 of Figure 27;

Figure 29 is a sectional view taken along the line 29—29 of Figure 30;

Figure 30 is an end view of the controller, with the brake control cylinder shown in section, said view being taken along the line 30—30 of Figure 26 and looking in the direction of the arrows;

Figure 31 is a sectional view taken along the line 31—31 of Figure 26 and looking in the direction of the arrows;

Figure 32 is a top view of the slotted guide plate for guiding the operating lever, said view being taken along the line 32—32 of Figure 30;

Figure 33 is a sequence diagram for the cam operation of the controller of Figure 26;

Figure 34 is a diagrammatic view illustrating the system of the present invention as applied to the draw works of an oil well drilling system;

Figure 35 is an enlarged front view of the drill bit weighing apparatus of Figure 34;

Figure 36 is an end view of the apparatus of Figure 35;

Figure 37 is a section taken along the line 37—37 of Figure 35;

Figure 38 is a sectional view through a relay for holding a predetermined value of weight on the drill bit in a deep well drilling apparatus;

Figure 39 is an end view of the relay of Figure 38;

Figure 40 is a diagrammatic view of a modified form of power system capable of regenerative braking;

Figure 41 is a fragmentary view corresponding to Figure 5 and showing the location of the pneumatically controlled valves on one of the power units of Figure 40;

Figure 42 is a sectional view taken along the line 42—42 of Figure 41 and looking in the direction of the arrows; and Figure 43 is a sectional view taken along the line 43—43 of Figure 41 and looking in the direction of the arrows.

Throughout the various figures of the drawings like reference numerals designate like parts.

Figure 18:
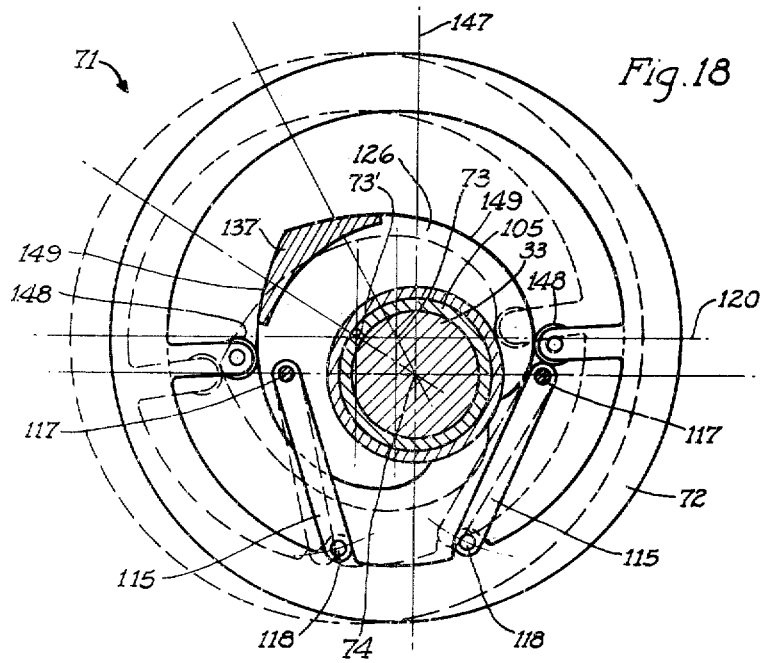
Figure 18 is an enlarged view taken along the line 18—18 of Figure 11 and showing alternate positions of the high pressure valve rod eccentric ring and the cam for adjusting it.

The power system is indicated in general in Figure 1, to which reference may be had. The system includes an air compressor unit 1 which may be of any desired construction, but in this instance consists of eight separate air compressor cylinders 2, each of a separate unit, said eight cylinders being driven in any desired manner as, for instance, by a motor or internal combustion engine 3. Ordinarily they are driven at a constant speed, and the outputs of the respective compressor cylinders 2 are controlled by unloader valves. The internal combustion engine includes a fly wheel 5 and a drive shaft 6. The compressor cylinders receive air from a low pressure main 7 and deliver air to a high pressure main 8. The pressure in the low pressure main is maintained at a constant value, preferably of several atmospheres, say, 100 pounds per square inch absolute, by an auxiliary air compressor 10 driven by the drive shaft 6. The compressor 10 takes air from the atmosphere and delivers it to the low pressure main 7 whenever the pressure therein drops below a predetermined value. Suitable automatic control devices, known in the art, are provided for controlling the output of the auxiliary air compressor 10 to maintain the pressure in the low pressure main at its predetermined constant value. As previously stated, the compressor cylinders 2 receive air from the low pressure main and compress it and deliver it to the high pressure main. Any one or more of the compressor cylinders 2 may be disabled by pneumatically controlling an unloading device 12 which maintains the air inlet valve to that compressor cylinder permanently open as long as the unloading device is actuated. Each unloading device 12 may be of any preferred design, one suitable design being shown and described in Marks' Mechanical Engineers Handbook, third edition, page 1873, to which reference may be had. The discharge valves of the compressor are spring seated and may be of any preferred design, suitable designs being illustrated and described in the same handbook on page 1866. A safety valve 13, normally closed, interconnects the high pressure and low pressure mains, and opens to interconnect those mains if the pressure in the high pressure mains becomes excessive.

While the load is at rest the air compressor idles under control of its unloading devices 12 which are controlled by a controller 15. The connections between the controller 15 and the air compressor, for controlling the unloading devices, are made of flexible metal tubing 16 which, for easy handling, can be grouped into a single cable with multiple plug-in devices 17—17 at both ends. The controller 12 may be manually operated to actuate any number of unloading devices 12, to disable the corresponding compressor cylinders 2, and thus reduce the output of the compressor, as will be more fully described hereinafter. If all of the unloading devices are actuated, the compressor idles. The controller 15 also controls a reversing device on the air engine, to be more fully described as this description proceeds.

A compressed air engine is indicated at 20. The engine receives air from the high pressure main 8, expands it to the pressure of the air in the low pressure main 7, and discharges into the low pressure main. In this instance the engine is shown as driving a load indicated at 21. A governing and reversing device 22 controls the eccentric cams that operate air intake and air outlet valves of the compressed air engine. The governing and reversing device 22 is pneumatically controlled by the controller 15 through a forward air tube 23 and a reversing air tube 24.

While any standard type of steam engine can be designed to operate on compressed air and therefore any type of compressed air engine may be used in the system of Figure 1, the service for which the engine is to be used will usually favor some one particular type of engine. The engine that appears to be best adapted to the draw works of an oil well drilling rig is of the radial type. A description of one such suitable engine will be given, for which reference may be had to Figures 2 to 6 inclusive. The engine 20, illustrated more fully in Figures 2 to 6, is a fourteen cylinder engine having two rows of seven cylinders each, radially arranged, and a crank shaft with two throws 180° apart. One row of seven radially arranged cylinders is indicated at 30. The second row of seven radially arranged cylinders is indicated at 31. A power crank shaft 33 has two crank throws 34—35, 180° apart. The two crank throws are connected to the respective pistons 36 in any desired manner, as shown for instance in Figures 2 and 4. A connecting rod 37 is pivotally connected to one of the pistons 36 and has a crank head 38 consisting of two split parts bolted together and embracing a bearing on the crank. The remaining connecting rods 39 of the set of cylinders 31 are pivoted to the respective pistons and to the crank head 38.

Each cylinder 31 has a cylinder head 40 thereon which is divided into a high pressure valve chest or head 41 and a low pressure valve chest or head 42. The heads on each of the fourteen cylinders are of identical construction. Each of the fourteen high pressure valve heads is connected by a separate high pressure conduit 43 to a high pressure header 44, and each of the fourteen low pressure valve heads is connected by a low pressure conduit 45 to a low pressure header 46. The headers 44 and 46 are connected respectively to the high pressure main 8 and the low pressure main 7.

It is desired that the valve action of the air engine shall be such that an indicator diagram taken on any cylinder thereof will closely approximate an indicator diagram taken on any one of the compressor cylinders. While the compressed air engine is driving the load the length of cut-off of the admission valve should be so controlled that at the end of the power stroke the pressure in the cylinder will closely approximate the pressure in the low pressure main. Also, the point of closure of the exhaust valve should be so controlled that at the end of the reverse stroke the pressure in the clearance space will closely approximate the pressure in the high pressure main. Figure 7 shows adiabatic expansion and compression curves for air between a low pressure of 100 pounds per square inch absolute and a high pressure of 900 pounds per square inch absolute. Assume that the engine is to operate at 600 pounds per square inch. Air should therefore be admitted to the cylinder at 600 pounds per square inch until the piston has travelled 24.2% of its stroke. This value is obtained from the curve 50 of Figure 7 at 600 pounds per square inch absolute. At that point in the stroke of the piston the admission valve must close, and thereafter the air in the cylinder is expanded along the curve 50 until the piston reaches the end of its stroke, at which time the pressure in the cylinder will be 100 pounds per square inch absolute. The exhaust valve must then open and remain open until the piston has returned 87% of its stroke, whereupon the exhaust valve closes. For the remainder of the stroke compression of the air remaining in the cylinder takes place. This compression takes place along a curve such as indicated at 51, and continues until a value of 600 pounds per square inch absolute is reached, whereupon the admission valve again opens.

Because of the steepness of the curve 51 at the higher values of pressure, which becomes almost vertical at 600 pounds pressure, it will be impractical to make mechanically operated valve settings close enough to bring the pressure in the cylinder within the limits that appear desirable at the time a mechanical valve is to open. To solve this problem, and for additional reasons that will appear as this specification proceeds, each cylinder is equipped with two sets of admission valves and two sets of exhaust valves. One admission and one exhaust valve of each cylinder is of the mechanically operated, mushroom type. The other exhaust valve and the other admission valve are of the type that are automatically operated by reversals of air pressure. With this combination of valves, settings of the mechanically operated valves should be made so that while the engine is driving the load, the automatic valve opens first and then the mechanical valve opens.

An explanation will now be given of the valve action whereby the above results are obtained. The low pressure valve head 42 is illustrated more fully at the top of Figure 2. The low pressure valve head 42 of the cylinder 31 includes a mushroom type mechanically operated valve 56 which is urged to its closed position by a spring 57 and when opened establishes communication between the low pressure conduit 45 and the cylinder 31, through the valve. A second valve 58, of the automatic type, is operated by reversals of air pressure and may be of a specific construction such as shown, for instance, in Marks' Mechanical Engineers Handbook, third edition, page 1866. It is sufficient here to state that this valve is maintained closed by a light spring and opens whenever the pressure in the cylinder 31 drops a trifle below the pressure in the low pressure main 45. The high pressure valve head of the cylinder 31 is of the same construction as the high pressure valve head of the cylinder 30, illustrated in section at the bottom of Figure 2, and includes a mushroom type mechanically actuated valve 56' which is maintained closed by a spring, and an automatic valve 58' similar to the valve 58, which is normally closed and is arranged to be automatically opened when and if the pressure in the cylinder 30 slightly exceeds the pressure in the high pressure header 44, to which the high pressure valve head 41 is connected. With this combination of valves, settings of the mechanically operated valves should be made such that when the engine is driving the load, as the piston approaches the end of its power stroke, events will take place in the following order: The pressure within the cylinder 31 approaches and then equals the pressure in the low pressure air main. The automatic valve 58 thereupon opens and thus continues to equalize the pressure on opposite faces of the mechanical valve 56. An instant later the mechanically operated valve 56 opens so that the reclosure of the automatic valve 58 is of no effect. It thus follows that at the time of operation of the mechanical valve 56 the pressures on opposite faces of the mechanical valve are identical. The mechanical valve is maintained open until the piston has made a predetermined fraction of its return stroke, whereupon the mechanical valve closes and compression of the air in the cylinder 31 takes place. During compression the pressure on the mechanical valve 56 assists in holding that valve closed. The compression continues until the pressure within the cylinder equals the pressure in the high pressure main 8, whereupon the automatic high pressure valve 58' opens thereby continuing to equalize the pressure on opposite faces of the mechanically operated intake valve 56'. A moment after the opening of the automatic valve 58', the exact time interval being unimportant, the valve 56' opens to continue to admit air from the high pressure header 44 into the cylinder, even after the automatic valve 58' recloses. The intake of high pressure air into the cylinder thus continues entirely under the control of the mechanically operated valve 56'. The piston is then making its power stroke. When the piston reaches a predetermined position, determined by the setting of the governor as hereinafter explained, the mechanical admission valve 56' closes, and the piston continues its power stroke under the force of the expanding air in the cylinder. The point of cut-off of the mechanically operated admission valve is so correlated to the pressure in the high pressure main that at the time of closure of that valve the amount of air in the cylinder will be such as to be expanded to exactly the pressure in the low pressure main when the piston reaches the end of its power stroke.

An explanation of the mechanism for operating the valves 56—56' will now be given. All mechanically operated exhaust valves 56 are operated by a single eccentric 70 on the shaft 33. All mechanically operated admission valves 56' are operated by another eccentric 71 on the same shaft. The motion set up by the eccentric is carried to each valve stem through a radial rod. This is illustrated in Figures 2, 3 and 6. In Figure 6 the eccentric ring of the eccentric 71 is shown at 72. The center of this eccentric ring is indicated at 73 whereas the center of the crank shaft 33 is indicated at 74, the distance between the centers 73 and 74 being the eccentricity of the eccentric. A split ring 75 fits over the eccentric ring 72, said eccentric ring rolling in said split ring 75. The split ring 75 has one valve rod 76 rigid with half of the ring. A pair of arcuate plates forming a split ring 75' extend over one face of the ring 75 and the eccentric ring 72. A similar pair of arcuate plates forming a second split ring extend over the opposite face of the ring 75 and the eccentric ring 72. The plates 75'—75' are bolted together and to the split ring 75 and thus secure the two halves of the split ring 75 together and keep the split ring 75 from sliding axially off of the eccentric ring 72. Valve rods 76 are pinned at one end between the ring plates 75'—75' by pivot pins 77.

The inlet valve rod 76 of Figure 2 has a cam surface 78 and a reduced width portion 79. That valve rod extends between a pair of arms 80—80 of a bracket secured to the high pressure valve head 41, and is guided between a roller 81 carried by the arms 80 and a second roller 82 on a rocker arm 83. The rocker arm 83 is pivoted to the bracket arms 80 about a pivot 84. The motion of the valve rod 76 guides the rocker arm 83 which through a push rod 85 opens the mechanically operated admission valve 56' against the action of a closing spring 57'. The principal function of the rocker arm is to step up the motion imparted by the eccentric rod 76 at the cam surface 78 thereof. In Figure 2 the rocker arm 83 has a one to two step up so that the push rod 85 moves twice as far as the motion of the roller 82 of the rocker arm 83.

With the cylinders arranged in two rows, as illustrated in Figure 2, alternate valve rods 76 that are actuated by the eccentric 71 operate the mechanically operated admission valves of the row of cylinders 30 and the intervening alternate valve rods 76 that are actuated by the same eccentric 71 operate the mechanical admission valves of the cylinders 31. Those valve rods 76 which operate the admission valves of the cylinders 30 are effective through the cam surfaces 78 to open the valves upon radial outward movement of the valve rods, as illustrated in Figure 2. The intervening rods 76, namely, those that operate the mechanical admission valves of the cylinders 31, are effective to open the valves upon radial inward movement of the valve rods, as illustrated in Figure 3. To accomplish this, the valve rods which operate the admission valves of the cylinders 31 are each provided with a cam surface 86 (Fig. 3) that actuates a rocker arm 83' mounted on a bracket 80' that is secured to the high pressure valve head 41 of the cylinder 31, as illustrated in Figure 5. Upon radial inward movement of the valve rod the cam surface 86 is effective to open the valve by pushing the valve rod 85' to the left. In the position illustrated in Figures 2 and 3 the eccentric 71 is in its uppermost position so that upon turning of the eccentric, the rod 76 of Figure 2 is moved downwardly and the rod 76 of Figure 3 is also moved downwardly. Thus the valve rods which control the admission valves of the cylinders 30 operate alternately with the valve rods that control the admission valves of the cylinders 31. The respective valve rods are arranged so that an outward movement of a rod to open an admission valve of a cylinder 30 is followed by an inward movement of another rod almost 180° away to operate a valve of a cylinder 31 that is located nearly 180° away from the cylinder whose valve was last operated.

The mechanically operated exhaust valves of the two rows of cylinders are operated by the eccentric 70 through valve rods similar to the rod 76. To that effect alternate valve rods actuated by the eccentric 70 open the mechanically operated exhaust valves of the cylinder 30 by a radial outward movement, as may be seen from Figure 3, whereas the intervening alternate valve rods actuated by the eccentric 70 open the exhaust valves of the cylinders 31 by a radial inward movement, as may be seen from Figure 2. The arrangements of the valve rods are such that the exhaust valve of one cylinder 30 is mechanically opened followed by the opening of an exhaust valve of a cylinder 31 almost 180° distant therefrom. The eccentric and valve rod structure for actuating the exhaust valves are similar to the corresponding structure for actuating the admission valves, as above described, differing therefrom essentially in that the shapes of the adjusting cams, to be presently described, for adjusting the eccentricities of the eccentric rings, are different because the required exhaust cut-off is different from the required admission cut-off, as will be pointed out in a discussion of the valve diagram as this description proceeds.

The speed of the engine is varied, as previously stated, by varying the rate of air input into the high pressure main, in a manner to be more fully set forth as this description proceeds. The pressure in the high pressure main varies with variations in torque but not in direct proportion thereto. In order that an indicator diagram of a cylinder of the engine shall follow as closely as possible a diagram taken simultaneously from a cylinder of the compressor it is necessary that the point of admission and cut-off of the air be changed as the pressure of the high pressure main 8 is changed. This result is obtained by moving the centers of the eccentrics 70 and 71 in a straight line at right angles to the crank shaft, thus altering both the eccentricity and the cut-off but keeping the lead constant.

An explanation will now be given of the means for moving the center of the eccentric. For this purpose reference should be had first to Figures 8 through 19 showing the manner of mounting the eccentric upon the crank shaft 33. In those figures the valve rod operating heads and associated parts surrounding the rings of the eccentrics 70 and 71 have been omitted. The eccentric 70 that controls the mechanically operated low pressure valves includes an eccentric ring 101 similar to the eccentric ring 72 of the eccentric 71. The two eccentrics are mounted on a sleeve 105 that is keyed to the shaft 33. The sleeve 105 is a length of tubing on which the eccentrics are assembled, which tubing and assembly may then be slipped on the end of the shaft 33. The eccentric ring 101 is supported on the sleeve 105 in the following manner: A pair of similar collars 103—104 are keyed to the sleeve 105 on opposite sides of the eccentric ring 101. The collars 103—104 have integral ears extending therefrom, as may be seen from Figures 14 and 15. A pair of identical links 106—106 are pivoted to the collar 104 about pivot pins 107—107 and a similar pair of links are similarly pivoted to the collar 103. At their opposite ends the links are pivoted to and support the eccentric ring 101 by pivots 108. The links 106 are of equal lengths, approximately equal to the radius from either pivot 108 to the center 110 of the eccentric ring 101. The distance between the pivots 107—107 is approximately twice the distance between the centers of the pivots 108—108. The distance between the pivots 107—107, and between the pivots 108—108, and the lengths of the links 106—106 are so proportioned that a point on the perpendicular bisector of a line joining the centers of the pivots 108—108 moves in approximately a straight line. This point is the center 110 of the eccentric ring 101. This is a well known type of straight line motion linkage known as the Roberts's straight-line motion, and is described on page 39 of a book entitled, "Experimental Mechanics," by A. Frederick Collins, published 1931 by D. Appleton & Co. If desired the straight line motion mechanism may be the proportions illustrated in my Patent No. 2,198,635, issued April 30, 1940, to which reference may be had.

Figure 19:
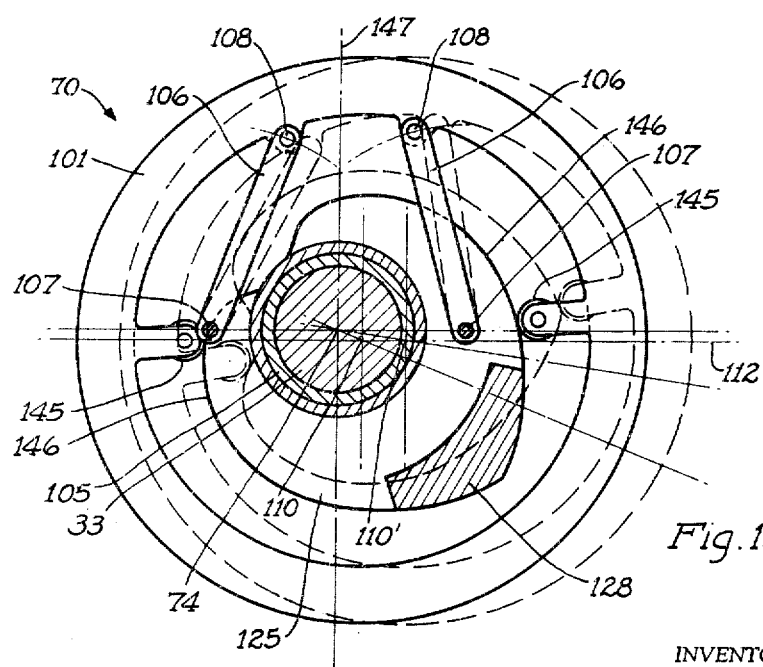
Figure 19 is an enlarged view taken along the line 19—19 of Figure 11 and showing, in dotted lines, an alternate position of the low pressure valve of the eccentric ring and the cam for adjusting it.

In Figures 14 and 19 the center of the shaft 33 is indicated at 74. The center of the eccentric ring 101 is indicated at 110. If the links 106—106 are tilted with respect to the collars 103—104 upon which the links are mounted, the point 110 will move in a straight line the locus of which is indicated by the line 112. Thus as the center point 110 is caused to move along the line 112 the distance between the center point 110 and the center 74 of the shaft 33 changes, thus changing the eccentricity of the eccentric ring 101.

The eccentric ring 72 is supported on the shaft in much the same manner as is the eccentric ring 101, as is illustrated in Figures 12, 15 and 18. The eccentric ring 72 is supported by four identical links 115, two of which are pivoted at one end to the collar 104 and the other two of which are pivoted at one end to a collar 116 similar to the collar 104 and likewise keyed to the sleeve 105. The links 115 are pivoted to the collar 116 by pivot pins 117—117 and pivotally support the eccentric ring 72 by pivot pins 118. In the case of the eccentric ring 72 the proportions of the links 115—115, the distance between the pivots 118—118 and the distance between the pivots 117—117 are such that a point 73 on the perpendicular bisector of a line between the centers 118—118 moves on a straight line as the links are pivoted about their pivots 117—117. The proportions are such that the point 73 coincides with the center of the eccentric ring 72. The locus of the point 73 is indicated by the line 120. It is to be noted that as the center 73 of the eccentric ring 72 is shifted by tilting of the links 115, its distance from the center 74 increases, thus increasing the eccentricity of the eccentric.

A low pressure cam 125 is loosely mounted on the sleeve 105 and is located within the eccentric ring 101. A high pressure cam 126 is also loosely mounted on the sleeve 105 and is located within the cam ring 72. The cams 125 and 126 are rigidly connected together to move in unison. For this purpose the cam 125 has, integrally formed therewith, a projecting lug 128 which extends into and is bolted to a ring 129 (Figs. 13 and 14) by a pair of bolts 130—130. The ring 129 loosely surrounds the collar 104 that is keyed to the sleeve 105. The cam 126 has a projection 133 integral therewith which also extends into and is bolted to the ring 129, as by bolts 135—135. The cam 126 has an additional projection 137 which is bolted at 138 to a projection 139 on an arm that extends from a sleeve 140 loose on the sleeve 105. A spur gear 141 is keyed to the sleeve 140. Another spur gear 142 is keyed to the sleeve 105. By turning the spur gears 141 and 142 with respect to one another, thus turning the sleeve 140 with respect to the sleeve 105 the cams 125—126 are moved in unison with respect to the eccentric rings 101 and 72 respectively.

The eccentric ring 101 has a pair of roller cam followers 145—145, as illustrated in Figures 14 and 19. These cam followers ride along the cam surfaces 146—146 of the cam 125. Likewise the eccentric ring 72 has a pair of roller cam followers 148—148 that ride on the cam surfaces 149—149 of the cam 126. Ordinarily the sleeve 140 of the unitary structure of Figure 13 rotates in unison with the sleeve 105 of the unitary structure of Figure 11. Hence there is no relative rotation between the roller cam followers 145 and their cam 125, and no relative rotation between the roller cam followers 148 and their cam 126. Thus during the time when the engine speed is not being regulated the centers of the eccentrics 72 and 101 rotate about the center 74 of the shaft, with an eccentricity determined by the setting of the two cams 125—126.

The settings of the two cams 125—126 may be changed simultaneously by turning the sleeve 140 with respect to the sleeve 105. If this is done then the cam 125 is rotated about the axis of the shaft 33 as a center and the cam 126 is likewise rotated about the same center. Actuation of the cam 125 causes the cam to act on the cam followers 145—145 to tilt the linkages 106—106 of the straight line motion mechanism thereby shifting the point 110, which is the center of the eccentric ring 101, along the line 112 (Fig. 19). The turning movement of the cam 126 causes this cam to act on the cam followers 148—148 to tilt the links 115—115 of that straight line motion mechanism, thereby producing a movement of the point 73, which is the center of the eccentric ring 72, along the straight line 120. It is thus apparent that by an angular movement of the sleeve 140 with respect to the sleeve 105 there is produced a straight line shifting of the centers of the admission eccentric ring 72 and the exhaust eccentric ring 101. This alters the eccentricity of each eccentric but keeps the leads constant.

Figures 18 and 19 show, in full lines, the positions of the cams 126 and 125 controlling the eccentric ring 72 and 101 when the pressure in the high pressure main is 600 pounds per square inch absolute. At that time the centers of the eccentric rings 72 and 101 are at 73 and 110 respectively. The cams are rotatable from the positions shown in full lines to the positions shown in dotted lines to vary the admission cut-off and compression cut-off as the pressure in the high pressure main changes or is changed. The dotted line positions of the cams and eccentric rings are the positions assumed when the pressure is 150 pounds per square inch absolute. As the pressure changes from the upper pressure to the lower pressure the turning of the cam 126 shifts the center of the eccentric ring 72 along the line 120 to the point 73'. At the same time the turning of the cam 125 shifts the center of the eccentric ring 101 along the line 112 from the point 110 to the point 110'. Those positions represent the extremes of movement of the centers of the eccentrics 72 and 101 while the engine is operating in one direction. To operate the engine in the reverse direction the cams 125 and 126 are rotated clockwise past the center line 147. As this rotation takes place the center of the eccentric 72 moves to the right along the line 120 past the center line 147. The adjustment of the cam 126 for different pressures moves the center of the eccentric 72 along the line 120 between two points on the opposite side of the center line 147 similar to the spacings of the points 73—73' shown. The action of the cam 125 is similar to that of the cam 126.

A differential gear 150, best shown in Figures 8, 9 and 10, is provided for producing controlled relative rotation of the sleeve 140 with respect to the sleeve 105 during the operation of the motor. One rotary element of the differential is in mesh with the gear 141 and another rotary element of the differential is driven by the gear 142, the gear ratios being such that the gears 141—142 are rotated at the same angular speeds when the third rotary element of the differential remains stationary.

Reference may now be had to Figures 8, 9 and 10 for an explanation of the action of the differential gear 150. The differential includes a shaft 152 journalled in suitable bearings in a casing 153. A spider 154 is rotatably mounted on the shaft 152 and includes four stud shafts 155 spaced 90° apart and each carrying a bevel gear 156 freely rotatable about the stud shafts. The four stud shafts are journalled inside a ring 157 which has spur gear teeth 158 on the outside thereof. The teeth 158 are in mesh with the teeth of the spur gear 141. A collar 159 is rotatable on the shaft 152 and has a spur gear 160 and a bevel gear 162 keyed thereto. The gear 160 is in mesh with the spur gear 142. The spur gear 160 through the collar 159 drives the bevel gear 162 which is in mesh with the four gears 156 on the spider 154. The gears 156 are in mesh with a bevel gear 163 which is keyed to the shaft 152. For an understanding of the operation of the differential assume that the shaft 152 is held stationary. The crank shaft 33 rotates the gear 142 which drives the gear 160, which in turn rotates the collar 159 and thus the gear 162. The gear 162 drives the four gears 156. Since the shaft 152 is assumed to be held stationary the gear 163 is also held stationary. Thus the rotation of the gear 162 causes the gears 156 to drive the spider 154 about the shaft 152 as a center and thus rotate the gear 157, which in turn drives the gear 141. The differential thus interconnects the gears 141 and 142. Since the gear 142 is keyed to the sleeve 105 which in turn is keyed to the shaft 33, it follows that the shaft 33 drives the gear 142 directly, and drives the gear 141 through the differential. The gear ratios are such that with the shaft 152 held stationary the driving ratio of the differential, between the gear 142 and the gear 141, is a one to one ratio. The gear 141 is driven at exactly the same angular speed as the speed of the gear 142. Thus as long as the shaft 152 is held stationary the cams 125 and 126 are rotated at exactly the same speed as the speed of rotation of the eccentric rings and there is no relative motion between the two. If it is desired to produce a shift or relative motion of the cams 126—126 with respect to the crank shaft 33, it is merely necessary to turn the shaft 152 the desired number of degrees. This may be done manually or automatically, while the shaft 33 is rotating or is stationary, by means of a reversing device and governor, to be presently described.

Figure 24:
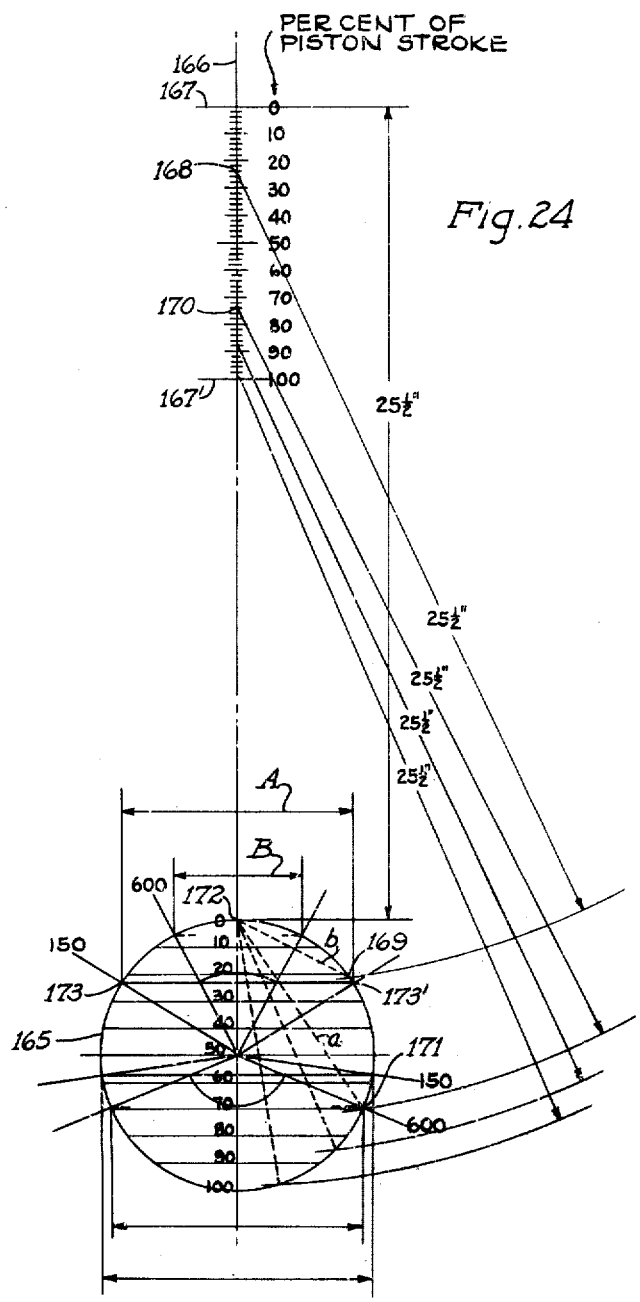
Figure 24 is a valve diagram for the compressed air engine of the present invention.

As previously stated, the valve action of the engine of the present invention is such that an indicator diagram taken from any cylinder thereof will closely approximate an indicator diagram taken on any cylinder of the compressor unit or, stated conversely, a curve of the expansion of the air in the engine cylinder will closely approximate an adiabatic expansion curve of air between the limits of the intake and discharge pressure of the cylinder. It is therefore essential that the valve action shall be such as to give such a diagram. Referring now to Figure 7, it may be seen that when the engine is operating between the pressures of 100 pounds and 600 pounds per square inch absolute the admission valve should remain open during the first 24% of the piston stroke and then close. Expansion will then take place in the engine cylinder along the curve 50 so that when the piston reaches its limit of stroke the pressure within the cylinder will be 100 pounds. On the other hand, when the engine is operating between 100 and 500 pounds pressure absolute the admission valve should remain open for the first 28% of the stroke (which is the value of the abscissa of the curve 50 at 500 pounds pressure) in order that upon expansion of the air in the cylinder the pressure will equal 100 pounds at the end of the stroke. The valve action is designed to give a variable admission depending upon the pressure in the high pressure main in accordance with the curve 50 of Figure 7. The design is attained in the following manner, for which reference may be had to Figures 24 and 25: Assume that the crank circle is indicated at 165 and assume a length of connecting rod six times the length of the crank. The locus of the travel of the piston end of the connecting rod is indicated by the line 166 between the limits 167 and 167'. This has been calibrated in terms of percentage of stroke from zero to 100. When the pressure in the high pressure main is 600 pounds the admission port must be open for 24.2% of the stroke, a figure obtained from Figure 7, curve 50, at 600 pounds pressure. On the scale 166 a point 168 is located at a position equal to 24% of the piston stroke. With this point as a center and with the length of the connecting rod as a radius, an arc is struck intersecting the circle 165 at a point 169. At 150 pounds pressure the admission port must be open for 73.5% of the piston stroke, as may be determined from the curve 50 of Figure 7. Those are the limits of pressure at which the engine is to operate. A point 170 is located on the line 166 at 73.5% of the stroke. With that point as a center and with the length of the connecting rod as a radius an arc is struck which intersects the circle 165 at 171. The cord a extending from the dead center position 172 to the point 171 subtends an angle from the center of the circle 165 equal to the angle of travel of the crank required to give an admission opening during 73.5% of the piston stroke, whereas the similar cord b extending from the point 172 to the point 169 on the circle 165 subtends an angle equal to the angle of travel for the crank required for 24.2% cut-off. The angle that the cord a makes with radii at the opposite ends thereof is therefore laid off equally on opposite sides of the center line 166 so that the cord A equals the cord a. This establishes the points 173 and 173'. The line 174 adjoining the points 173—173' thus establishes the admission lap of the valve gear. An angle equal to the angle subtended by the cord b of Figure 24 is laid off at the center of the circle and bisected by the line 166 so that the cord B equals the cord b. This angle, indicated by the arc 175, is the angle of admission of air when operating at 600 pounds per square inch absolute. The center of the admission eccentric must therefore be shifted between the points 173 and 176 as the pressure changes from 150 pounds to 600 pounds. At intermediate pressures the center of the admission valve eccentric must be positioned at intermediate points on the line 174.

By way of example, a description will be given of the manner of locating the position of the admission eccentric at a pressure of 225 pounds per square inch in the high pressure main, it being understood that the same procedure is followed for other pressures. At 225 pounds pressure in the high pressure main the admission cut-off should take place at 54% of the stroke, as may be determined from the curve 50 of Figure 7. A point is located on the scale 166 of Figure 24 equal to 54% of the stroke and with that point as a center an arc is struck with a radius equal to the length of the connecting rod. The angular distance from the point 172 to the point of intersection of this arc with the circle 165 is then measured and half of it laid off of each side of the line 166. This establishes the position of the line 177. The point 177' of intersection of this line with the line 174 determines the requisite center of the admission eccentric in order to give cut-off at 54% of the stroke, which is the cut-off necessary when the pressure is 225 pounds per square inch absolute.

The determination of the exhaust lap and the point of closure of the exhaust valve and the compression cut-off for different operating pressures is determined in the same way as above described for the admission valve.

In order that a fuller understanding of the valve design may be had an example will be given of the valve design for adiabatic compression and adiabatic expansion between the limits of 100 pounds per square inch and 600 pounds per square inch absolute based upon an assumed clearance volume of 5% when the piston is at its innermost position within the cylinder. For this purpose reference may be had to the following table:

TABLE I

*Adiabatic compression and adiabatic expansion between the limits of 100 p. s. i. and 600 p. s. i. abs. based on a clearance volume of 5%*

| 1 | 2 | 3 | 4 | 5 | 6 | 7 | 8 |
|---|---|---|---|---|---|---|---|
| Per cent Torque | Corresponding M. E. P. in p. s. i. | Corresponding high pressure, p. s. i. abs. | Admiss'n per cent Cutoff | Values in Col. #4 plus 5 | 5×105 divided by Values in Col. #5 | Values in Col. #6 minus 5 | Compression Cut-off equals 100 minus Values in Col. #7 |
| 465 | 203 | 600 | 24.2 | 29.2 | 18 | 13 | 87 |
| 405 | 177 | 475 | 29.4 | 34.4 | 15.3 | 10.3 | 89.7 |
| 352 | 154 | 400 | 34.1 | 39.1 | 13.4 | 8.4 | 91.6 |
| 306 | 134 | 333 | 39.0 | 44 | 11.9 | 6.9 | 93.1 |
| 266 | 116 | 288 | 44.2 | 49.2 | 10.7 | 5.7 | 94.3 |
| 232 | 101 | 252 | 49.5 | 54.5 | 9.6 | 4.6 | 95.4 |
| 201 | 88 | 225 | 54 | 59 | 8.9 | 3.9 | 96.1 |
| 175 | 76.5 | 205 | 59 | 64 | 8.2 | 3.2 | 96.8 |
| 152 | 66.5 | 185 | 62.9 | 67.9 | 7.7 | 2.7 | 97.3 |
| 132.2 | 57.7 | 170 | 67 | 72 | 7.3 | 2.3 | 97.7 |
| 115 | 50.2 | 160 | 70 | 75 | 7.0 | 2.0 | 98 |
| 100 | 43.6 | 150 | 73.5 | 78.5 | 6.7 | 1.7 | 98.3 |

The figures in this table are arrived at as follows: The maximum pressure in the high pressure main is set at 600 pounds. This figure is placed at the top of column 3. Planimeter readings taken from the curves of Figure 7 show that with a high pressure of 600 pounds absolute per square inch and a low pressure of 100 pounds absolute per square inch the corresponding mean effective pressure is 203 pounds per square inch above the low pressure. This determines the top figure in column 2. Assume that at the lowermost operative pressure the torque is to be taken at unity, or 100%. This is the figure placed at the bottom of column 1. Assume that it is desired to have a torque control range in twelve steps, each step to be 115% of the next lower value. The values in column 1 are then filled in starting with the lowermost value of 100% and working upwardly so that each higher value is 115% of its preceding lower value. This gives the values of column 1 and gives a maximum torque of 465% of the minimum torque. Since the mean effective pressures are proportionate to the torques, the corresponding values in column 2 may be obtained, being directly proportionate to the corresponding values in column 1. The values in column 2 are then ascertained since the top value of 203 is known. This gives the mean effective pressures required to obtain torques corresponding to the values of column 1. The values in column 3 are values of the pressure required in the high pressure main to give a mean effective pressure of the corresponding value in column 2 as determined by planimeter readings. That is, the indicator diagram must reach high pressures such as indicated in column 3 in order that planimeter readings shall give corresponding mean effective pressures as set forth in column 2. Column 4 gives the requisite admission cut-off for the corresponding pressures of column 3, said admission cut-offs being in terms of percent of the piston stroke and being obtained from the curve 50 of Figure 7. Column 5 is the same as column 4 with 5% added thereto for the 5% clearance. Columns 6 and 7 are intermediate values that are used for obtaining the values in column 8. An explanation will first be given of how the values in column 6 are obtained, for which reference should be had to Figure 7. At 600 pounds pressure, the curve 50 shows that the admission cut-off should be at 24.2% of the stroke or at a value of five points more than that when measured not from the base line 52, which is the end of the stroke, but from a line 53, which represents the clearance line and therefore is 5% to the left of the base line 52. It is also known that the curve 51, which is an adiabatic compression curve, must reach 600 pounds pressure absolute at the end of the stroke or at zero stroke. It is now required to find the point 54 at which the curve 51 must intersect the abscissa. Since the curves 50 and 51 are both adiabatic curves the distance $L_1$ is to $L_2$ as the distance X, which is the distance of the point 54 from the base line 53, is to 105, which is the distance from the base line 53 to the point where the curve 50 intersects the abscissa. Setting up an equation we now have $$\frac{L_1}{L_2} = \frac{X}{105}$$

$L_1$ is known as 5. Therefore $$X = 5\frac{(105)}{L_2}$$

For any given pressure the value of $L_2$ may be read from Figure 7, the value being five greater than the abscissa of the curve 50 at the corresponding pressure. The value of $L_2$ for different pressures are therefore the values given in column 5 of Table I. Thus for any given operating high pressure the corresponding compression curve 51 must intersect the base line at a distance from the line 53 given by the equation above. This gives the values for column 6. The values in column 7 are just five less than the values in column 6 and therefore give the distance from the end of the stroke at which the exhaust valve must be closed in order that upon completion of the stroke the air which was in the cylinder at the time of closure of the exhaust valve will be compressed to the desired pressure, as set forth in column 3. Column 8 is merely 100% minus the value in column 7, which indicates that compression commences upon the completion of that portion of the stroke of the piston.

It is to be noted that the action of the two automatic valves of each cylinder is controlled entirely by the difference between the pressure in the engine cylinder and the pressure in the high and low pressure mains, as the case may be, and that the opening and closing of the automatic valves is independent of the action of the pressure controlled cut-off. Therefore the automatic valves operate in the same manner regardless of the point of the admission cut-off or exhaust cut-off. If the automatic pressure responsive mechanism were to become disabled it could be locked to operate the admission cut-off at any appropriate fixed position without in any way interfering with the action of the two automatic valves of each cylinder. Since the two mechanical valves and the two automatic valves do operate effectively regardless of the pressure at which the mechanical valves are operated, it follows that the automatic valves can be used in combination with the mechanical valves of any air engine and will be valuable on an air engine that operates at a fixed cut-off.

An explanation will now be given of the construction of the governor and reversing device, for which reference should be had to Figures 8, 21 and 22. The function of the governor is to so time the operation of the mechanically operated valves of the engine that while the engine is operating on a load the valves will open on constant lead and will close slightly in advance of the theoretically correct cut-off so that in the next valve operation the automatically operated valves will open slightly ahead of them. In the embodiment of the invention here illustrated the governor is designed for stationary mounting, its movement being transmitted to the shaft 152 and through that shaft and differential to the cams. The primary force that reverses the engine and actuates the governor is the air pressure in the high pressure main. The governing and reversing mechanism 22 includes a stationary double acting governing cylinder 180, a movable double acting reversing cylinder 181, a long partially hollow piston rod 182 interconnecting the two cylinders, pistons 183—184 on the piston rod 182, and a governing spring 185 acting on the piston rod 182 to urge it to a central position. The piston rod 182 has collars 186—187 keyed thereon. Between these collars there is located tubes 188 and 189 through which the piston rod 182 extends. The tubes 188 and 189 have annular plate-like flanges 190—191 against which the opposite end of the spring 185 bears. The flanges 190—191 and the spring 185 are located within a casing 193 mounted in any desired manner upon the governing cylinder 180.

One end of the piston rod 182 has two incommunicable ducts 196—196' extending lengthwise therethrough. The duct 196 interconnects one side of the govening cylinder 180 with a corresponding side of the reversing cylinder 181. The other duct 196' connects the other sides of the same two cylinders together. The reversing cylinder 181 has a gear rack 194 secured thereto which is in mesh with a pinion 195 that is keyed to the shaft 152 of the differential. Air under pressure from the high pressure main 8 is supplied under the action of the controller 15, as will be more fully described as this description proceeds, to one or the other of the tubes 23—24 and to one side or the other of the governing cylinder 180. The pressure on one side of each piston 183—184 is thus the pressure in the high pressure main 8 whereas the pressure on the other side of each piston 183—184 is atmospheric pressure.

Figures 8 and 21 show the reversing cylinder 181 in the position that it occupies when pressure is applied to the pipe 24. At that time air at high pressure enters the cylinder 180 on the left hand side of the piston 183 and tends to move the piston 183 and the piston rod in a direction to the right as seen in Figure 21. The piston rod moves to the right and through the action of the collar 186 and the tube 188 compresses the spring 185. The piston 183 continues to move to the right until the pressure of the air admitted into the cylinder 180 through the pipe 24 is exactly counterbalanced by the spring 185. During the movement of the piston 183 to the right the piston 184 which is connected therewith moves the floating cylinder 181 with it. This cylinder and piston 184 move to the right as one unit, since the air duct 196 maintains the pressure in the cylinder 181 on the left hand side of the piston 184 the same as that in the high pressure main, whereas the duct 196' maintains the pressure on the right hand side of the pistons 183—184 the same as in the pipe 23, which is maintained at atmospheric pressure through the controller, as will be more fully set forth as this description proceeds. Thus any change in pressure in the high pressure main results in a corresponding change in the pressure in the pipe 24 and a corresponding movement of the piston rod 182 against the action of the spring 185. The moving piston rod 182 carries with it the reversing cylinder 181 which actuates the gear 195 to actuate the differential 150, in the manner previously described, to turn the cam shaft actuating the cams 125—126. The angular position of the cams with respect to the crank shaft 3 is thus determined by the amount of movement of the cylinder 181 which in turn is determined by the pressure in the high pressure main and the action of the spring 185. For any given pressure in the main 24 there is a corresponding angular position of the cams 125—126 with respect to the crank shaft 3. The movement of the governor piston 183 compresses the spring 185 and is thereby limited to that point at which the pressure on the piston 183 is balanced by the pressure of the spring 185. Thus the position of the cams for one direction of rotation of the air engine is determined by the action of the governor.

For the opposite direction of rotation of the air engine the positioning of the cams is also determined by the action of the governor. To obtain a reverse direction of rotation from that previously described, the controller 15, to be presently described, is set so as to apply atmospheric pressure to the pipe 24 and to apply the pressure of the high pressure main 8 to the pipe 23. High pressure from the pipe 23 is immediately transmitted through the duct 196' in the piston rod to the portion of the cylinder at the right hand face of the piston 184 and the pressure in the portion of the cylinder 181 on the opposite face of the piston 184 is made atmospheric pressure by the communicating duct 196 in the piston rod. The cylinder 181 therefore immediately moves a full stroke to the right, thus immediately actuating the gear 195 to turn the differential and thereby turn the eccentric cams 125—126 to set the engine valves for reverse direction of operation. The piston 183 moves to the left under the action of pressure supplied thereto from the pipe 23, thereby causing the collar 187 to force the tube 189 and plate 191 to compress the spring 185 so that the ultimate position of the piston 183 in its movement to left from the position illustrated in Figures 20 and 21 is again that position at which the air pressure on the piston 183 is exactly counterbalanced by the spring 185. Any change in pressure in the high pressure main results in a change in position of the piston 183 and corresponding shifting of the cylinder 181 and turning of the gear 195 to reset the eccentric cams 125—126 to a new position which is a function of the pressure in the high pressure main.

The ultimate positions of the eccentric rings with respect to the crank shaft for any given pressure value in the high pressure main are determined by the shapes of the cams 125—126 and the angular movement of the cams as determined by the spring 185 and the pressure in the high pressure main. The shapes of the cams and the calibration of the spring 185 must therefore be correlated. In the engine here described they are so correlated that an indicator diagram taken from any one of the engine cylinders will follow the adiabatic curves 50—51 to the particular pressure prevailing in the high pressure main. As the engine torque is increased, increments of additional air pressure must be increased at a faster rate than the desired increase of increments of torque. Compensation for this disproportion can be made either by taking care of this factor in the cam design or by making the governor spring 185 so proportioned or controlled that it will develop progressively increased increments of counter pressure at the rate required to supply the proper degree of compensation. One such design of spring is illustrated in Figure 21. It is made up of wire or rod 201 of rectangular cross section formed into a helix of cylindrical shape. Nested with the spring is a helical spaced member 202 made up of thin rectangular lamination strips also formed into a helix. These strips are of various lengths so grouped that as the spring is compressed successive turns of the spring 201 will progressively close on the spacer member. By properly proportioning the lengths of the various laminations 202 there can be obtained any desired spring calibration within the limits of the design. This is merely one way of obtaining the desired calibration of the spring. An equivalent effect can be obtained by winding the turns of the spring 201 with different spacings.

The spring 185 in the governor is pre-compressed to a degree such that the governor is inoperative at air pressures under 150 pounds per square inch. At pressures up to 150 pounds per square inch absolute the spring 185 maintains the governor piston rod 182 in the position illustrated in Figure 21.

It is obvious from the above description that the proper functioning of the engine is dependent upon proper functioning of the governor and that the spring design, correlated with the shape of the cam, constitutes the essence of the governing design.

An explanation will now be given of the construction of the controller 15 of Figure 1, which is shown more particularly in Figures 26 to 33 inclusive.

The functions of the controller are:

1. To set the reversing cylinder 181 of the governing and reversing mechanism 22 for the desired direction of rotation;

2. To operate the unloading devices on the air compressor in proper sequence and in such a manner as to obtain the desired torque and speed from the air engine;

3. To change the functioning of the engine from motoring to braking when desired;

4. To so control the flow of air through a by-pass between the high pressure main and the low pressure main as to obtain the desired braking torque and speed from the engine.

The control of all of these functions is centered in a single lever, the position of which determines the function to be performed and the values of speed and torque that the engine will develop. The controller 15 includes a base 250 upon which the various parts are mounted to constitute a unitary assembly. A pair of brackets 251—251 (Figs. 26, 27 and 30) carry a shaft 252 that is journalled in bearings in the brackets so that it is rotatable and also longitudinally movable. A hand operating lever 253 is keyed to the shaft and extends upwardly therefrom through a slotted arcuate plate 254 that is bolted or otherwise secured in position to and extends between the two brackets 251—251. The plate 254 is of a shape such as is shown more particularly in Figures 30 and 32 and has a U-shaped slot therein consisting of two parallel longitudinal slots 255—256 joined by a cross slot 257. The movement of the lever 253 is guided by the slots 255, 256 and 257. The lever 253 may be moved in either of the slots 255—256 to produce a corresponding oscillation of the shaft 252, or it may be moved from one of the slots to the other, through the cross slot 257, producing a corresponding longitudinal or axial movement of the shaft 252. A gear 260 is keyed to the shaft 252 and is in mesh with and drives an elongated pinion 261 keyed on a rotatable cam shaft 262, journalled in brackets 263—263 mounted on the base 250. The shaft 252 is mechanically connected to a piston rod 264 that carries two pistons 265—266 in a cylinder 267, of a direction controlling pilot valve 268, as may be seen from Figure 27. A tube or conduit 269 connects the cylinder 267 to the high pressure main between the pistons 265—266. Tubes 23 and 24 on opposite sides of the tube 269 extend, respectively, to the forward and reverse cylinder outlets of the reversing device 22, in accordance with the connections illustrated in Figures 1 and 21. When the pistons 265—266 are in the positions illustrated in Figure 27 communication is established from the high pressure main by way of the tube 269 to the reverse direction controlling tube 24. At the same time the forward direction controlling tube 23 is open to atmosphere at the cylinder 267. If the piston rod 264 is moved to the right from the position illustrated in Figure 27 the tube 24 will be opened to atmosphere at the cylinder 267 and the tube 23 will in turn be connected to the high pressure main via the tube 269. Movement of the piston rod 264 to the right from the position illustrated in Figure 27 is effected by manually shifting the hand operated lever 253 crosswise through the cross slot 257, thus moving the shaft 252 to the right and with it the pistons 265—266.

The cam shaft 262 has keyed thereto a plurality of cams, in this instance six in number, indicated at 271 to 276 inclusive, so that rotation of the cam shaft results in rotation of all six of the cams. The cam 276 is illustrated in Figure 31. This cam controls a bell crank lever 278 pivoted at 279 and carrying at one end a cam roller 280 in engagement with the cam 276, and at its opposite end through a link 281 controlling the position of a piston 282 in the cylinder of a pilot valve 283, which piston in one position, that illustrated in Figure 31, establishes communication between a manifold 284 that is connected to the low pressure main, and a flexible metal tube 16 that extends to the unloader of the inlet valve of one of the cylinders 2 of the compressor. A manually operable three-way valve 285 is interposed between the tube 16' and the cylinder 283 for a purpose to be more fully set forth as this description proceeds. At the present it is sufficient merely to point out that a valve 285 is provided in only one of the six unloader controlling tubes 16 leading from the controller 15 to the unloaders on the cylinders 2, as may be seen from Figures 1 and 26. The piston 282 in its alternate position in the cylinder 283 (Fig. 31) closes off communication between the tube 16 and the low pressure manifold 284 and opens the tube 16 to atmospheric pressure, thereby disabling the corresponding unloader and allowing the corresponding compressor valve controlled by the tube 16 to operate in its normal manner. Each one of the cams 271-276 operates a similar bell crank 278 to actuate a pilot valve 283 to control different unloaders through pressure applied from the low pressure main to the corresponding tube 16. The cams 271-276 are so arranged as to give the proper sequence of opening and closing of the unloader valves of the compressor cylinders 2. When the controller handle 253 is in the neutral position illustrated in Figure 27, all of the cams 271-276 control their respective pilot valves 283 to apply pressure to the respective unloading devices so that the respective intake valves of the compressor cylinders 2 are all held open. The handle 253 has fourteen operative positions to one side of its neutral position in each of the slots 255—256.

A sequence diagram for the operation of the cams 271-276 is illustrated in Figure 33. In position 1 cam 276 releases its unloading device. In positions 2, 3 and 4 cams 275, 274 and 273 successively release their unloading devices. In position 5 cam 272 releases its unloading device and cams 273 to 276 again operate their unloading devices. In positions 6, 7, 8 and 9, respectively, cams 276 to 273, respectively, successively release their unloading devices. In position 10 cam 271 releases its unloading device and cams 273 to 276 actuate their unloading devices. In positions 11 to 14 inclusive, cams 276 to 273 successively release their unloading devices. The full lines 286 in Figure 33 indicate the positions at which the unloading devices controlled by the respective cams are released, which correspond to the positions of the controller during which the corresponding air compressor cylinders of the air compressor are functioning.

As previously stated, the air driven compressor unit 1 consists of eight separate cylinders 2.

Four of the cylinders are shown in Figure 1, the other four being located immediately below the four cylinders shown in Figure 1. In the preferred arrangement four of the cylinders are of uniform size and are small cylinders. The other four cylinders are of uniform size and are large cylinders. Each of the large cylinders is preferably of a diameter which is 1.58 times the diameter of a small cylinder or a cross sectional area 2.5 times the cross sectional area of a small cylinder. Cams 273, 274, 275 and 276 each control the unloader of one small cylinder. Cam 271 controls the unloaders of two large cylinders simultaneously. Cam 272 controls the unloaders of the remaining two large cylinders simultaneously. If the output of a small cylinder, per revolution of the engine drive shaft 6, is taken as unity, then the outputs of each large compressor cylinder per revolution of the engine drive shaft 6 is 2½, and the output for each pair of large cylinders, per revolution of the shaft 6, is 5.

The controller 15 also includes a brake control cylinder 290 that has pistons 291—291' therein that control the establishment of communication between the high pressure main and the low pressure main through conduits 292—293 that lead respectively to the high pressure main and the low pressure main. The pistons 291—291' are connected to a piston rod 294. The piston rod 294 is connected through a link 295 and pin 296 to a pair of spaced parallel bell crank levers 297 that are pivoted at 298 to the brackets 251 and carry at their opposite end a roller 299 that is engaged by the hand operated lever 253, if the lever is moved back from the neutral position of Figure 30. As that lever 253 is moved back from the neutral position, that is, to the left from the position illustrated in Figure 30, it engages the roller 299 and swings the bell crank 297 counterclockwise to force the piston 291 progressively downward to progressively uncover more and more of the port areas in the cylinder 290 communicating with the conduit 293, thus progressively establishing a greater and greater flow of air from the high pressure main to the low pressure main.

An explanation of the operation of the system thus far described will now be given. Assume that the engine driving the compressors 2 is driven at a constant speed. Assume that the controller is in its neutral position. All of the unloader devices of the six compressors 2 are energized and therefore hold the automatic inlet valves of the compressor continuously open. Therefore no air is being forced from the low pressure main to the high pressure main. The auxiliary compressor is maintaining the pressure in the low pressure main constant at 100 pounds per square inch absolute. The controller handle is then moved to its first position. This releases the pressure on the unloading device of one of the compressor cylinders 2. That cylinder will commence to move air from the low pressure main to the high pressure main, delivering the air to the high pressure main at a constant rate. The pressure in the high pressure main will therefore build up. The compressed air engine 20 commences to operate. It will operate at a speed determined by the torque of its load and the pressure in the high pressure main. For each revolution of the compressed air engine a fixed quantity of air will be withdrawn from the high pressure main and returned to the low pressure main. As long as the rate of rotation of the engine 20 is such that the rate of withdrawal of air from the high pressure main by the engine is less than the rate of delivery of air thereto by the compressor, the pressure will continue to rise in the high pressure main. As the pressure continues to rise the engine 20 accelerates until ultimately it reaches a speed at which the rate of air withdrawal from the high pressure main by the engine 20 exactly equals the rate of input of air into the high pressure main by the compressor. The engine 20 will then continue to operate at that speed. Air thus circulates in a closed system from the low pressure main to the compressor, thence to the high pressure main, then to the compressed air engine and back to the low pressure main. At that time the auxiliary air compressor 10 merely serves to supply the low pressure main with an amount of air necessary to compensate for leakage. Should it be desired to increase the speed of the engine 20 it is merely necessary to increase the rate of air delivery to the high pressure main by the compressor. This is done by moving the controller to its second position thereby releasing the unloader device for another small compressor cylinder. The rate of air delivery into the high pressure main is thus doubled, and the pressure commences to rise. This causes the compressed air engine to accelerate thereby increasing the rate of withdrawal of air from the high pressure main. When the engine reaches such a speed that its rate of air withdrawal from the high pressure main again equals the rate at which air is delivered to the high pressure main by the compressor, equilibrium is established, and the engine will continue to operate at its new constant speed. To further increase the speed of operation of the engine it is necessary to release another unloader valve to bring another small compressor cylinder into operation. The controller in positions 1, 2, 3 and 4 brings into operation first one, then two, then three, and then four of the small cylinders. In position 5 the controller releases the unloading devices of two large cylinders and operates the unloading devices of the four small cylinders. The two large cylinders have a combined air output of five times the output of one small cylinder.

As previously stated, the speed of operation of the engine is determined by the rate of air delivered by the compressor into the high pressure main. The pressure in the high pressure main, at which the compressed air engine is operating, is determined by the torque of the load. It is desired that the pressure in the high pressure main should not rise above 600 pounds per square inch absolute. If the torque of the load is such as to require more than 600 pounds per square inch in order to move it, the load will not move, and as the pressure in the high pressure main rises above the 600 pound value due to the continued delivery of air to the high pressure main by the compressor without a corresopnding withdrawal of air by the engine, the safety valve 13 will operate to by-pass air from the high pressure main directly to the low pressure main. If the compressor is driven by a constant speed internal combustion engine having a definite maximum horse power, that will limit the maximum horse power of the compressed air engine. Since the number of compressor cylinders in service determines the speed of the compressed air engine 20, it follows that with a constant horse power driving engine for the compressors 2 the maximum torque that can be developed by the engine 20 will vary inversely with its speed and therefore inversely with the number of compressor cylinders 2 that are in service. The maximum possible torque for the compressed air engine will therefore increase as the number of compressor cylinders in service is decreased. At 600 pounds high pressure and 100 pounds low pressure the mean effective pressure is 203 pounds which develops the maximum torque possible for the engine 20. If the torque of the load requires a mean effective pressure over 203 pounds (above the 100 pounds absolute pressure of the low pressure main) the load will not start, and the pressure in the high pressure main will tend to rise, but such rise is prevented by the safety valve. The arrangement is such that at a speed of the compressed air engine 20 equal to that attained when three small compressor cylinders are in service and at a maximum torque obtainable with a high pressure of 600 pounds per square inch, the horse power output of the compressed air engine 20 is equal to the maximum horse power output of the internal combustion engine driving the compressors 2. This means that at the two lower speeds of the compressed air engine 20 obtained when one or two small compressor cylinders are in service, no larger torque can be carried by the compressed air engine and the internal combustion engine that drives the compressors therefore operates at below its maximum horse power.

From the above description it is apparent that the engine 20 permits a rise in pressure in the high pressure main to such a value and operates at such a speed that the torque developed by the engine exactly balances the torque of the load. If the torque of the load goes down (as in the case of a locomotive arriving at a decline in the road) the engine will tend to accelerate only momentarily, thereby withdrawing an additional amount of air from the high pressure main and thus reducing the pressure therein and eliminating the tendency to accelerate.

In the system of Figure 1 the compressed air engine 20 may also be used as a brake for the load. Assume that a load, such as a train of railroad cars, is driven by the engine 20 and it is desired to brake the speed of the train. The controller handle 253 is moved to its extreme back position, at the cross slot 257. The unloaders of the compressors 2 are energized, thereby stopping the delivery of air to the high pressure main. The pressure in the high pressure main immediately drops due to the withdrawal of air therefrom by the engine 20 and due to the establishment of a by-pass from the high pressure main to the low pressure main at the brake control cylinder 290 as the handle 253 is moved to the left of the position illustrated in Figure 30. The controller handle 253 while in this position is shifted through the cross slot 257 thereby actuating the pistons in the reversing pilot cylinder 268. This disconnects the high pressure pipe 269 (Fig. 27) from the tube 24 and connects it to the tube 23. The tubes 23 and 24 lead to the governing and reversing device, as previously explained. By reference to Figure 21 it may be seen that the changing of the application of air prressure from the tube 24 to the tube 23 results in the application of pressure by way of the tube 23, to the part of the cylinder on the right hand side of the piston 183 and the passageway 196' to the part of the reversing cylinder on the right hand side of the piston 184, thereby moving the reversing cylinder 181 to the right from the position illustrated in Figures 20 and 21 to the position illustrated in Figure 22, thus actuating the gear 195 and the differential 150 to set the cams 125 and 126 of the eccentrics that control the mechanical valves of the engine 20 for reverse direction of operation. The locomotive now drives the engine 20 as a compressor taking air from the low pressure main and delivering it to the high pressure main. At this time the automatic valves 58 and 58' of the engine of Figure 2 will open before the mechanically operated valves open, and close after the mechanically operated valves close. The automatic valves therefore become primary valves while the mechanically operated valves serve no useful function.

As the engine 20, now operating as a compressor, delivers air into the high pressure main the pressure in that main tends to rise. A rise in pressure is, however, prevented due to the discharge of air from the high pressure main to the low pressure main through the brake control cylinder 290 because the brake controller handle 253 is in its extreme left hand position. If the handle is moved to the position illustrated in Figure 30, thereby completely shutting off the by-pass between the two mains at the braking cylinder 290, the pressure will rise to its maximum value. As the engine continues to move the additional air forced thereby into the high pressure main is discharged into the low pressure main through the safety valve 13. The pressure therefore remains at 600 pounds and the locomotive receives the maximum braking effect until it comes to rest. If it is desired to reduce the braking effect it is merely necessary to move the controller back to the left of the position illustrated in Figure 30. As the hand operated lever 253 is moved back it acts on the roller 299 and bell crank 297 to force the piston rod 294 of the brake control piston 290 to move downwardly and thus establish an additional by-pass from the tube 292 that is connected to the high pressure main to the tube 293 that is connected to the low pressure main. This reduces the pressure in the high pressure main thereby reducing the braking effort. The amount of reduction of the braking effort is controlled by the amount of downward movement of the braking piston 291 by leftward movement of the handle 253. As the locomotive speed decreases, the rate at which air is forced into the high pressure main by the engine 20 operating as a compressor also decreases, and when the handle 253 maintains the braking control piston 291 uncovering the ports leading to the low pressure conduit 293 the pressure in the high pressure main gradually drops to the pressure in the low pressure main, thus gradually reducing the braking effect.

An explanation will now be given of the application of the power system of Figure 1 to the draw works of an oil well drilling rig, for which reference may be had to Figure 34. The air compressor unit 1 of Figure 1 is shown as located near the usual type of drilling rig 310. The drill pipe to the bottom of which the drill is connected is indicated at 311, said pipe being arranged to be rotated in the usual manner through a gear mechanism within a box 312 driven in any desired manner, as by a belt 313 leading to an engine. The engine may, optionally, be the same engine that drives the compressor 2, the belt 313 being shiftable from an idler pulley to a driving pulley on the shaft of that engine to start the drilling. A connection is provided at 315 for circulating mud through the bore to carry away the rock and other material loosened by the drill, all in a manner known in the art.

The weight of the drill pipe 311 is supported in a novel manner in order to permit the air engine to carry any desired fractional part of the weight, thereby controlling the remaining weight or pressure exerted by the drill bit at the bottom of the bore. To that effect a weighing device 320, shown more particularly in Figure 35, is interposed between the drill pipe 311 and the travelling block 321 that supports the drill pipe. The weighing device consists of a plate 322 which is suspended at 323 from the pulley block 321. The plate 322 has a pair of links 325—325 suspended therefrom, which links in turn support a bowed leaf spring assembly 326. A yoke 327 is supported at the center of the spring 326 and in turn supports the drill pipe 311. The pull of the drill pipe on the plate 322 determines the amount of deflection of the spring 326. The deflection of the spring moves a pointer 328 pivoted at 329 to the yoke 327 and at 330 to an extension of the plate 322. The pointer 328 moves over a calibrated scale 331 so that the position of the pointer on the scale 331 indicates the amount of downward pull of the drill pipe 311 on the plate 322 or, conversely, the upward pull of the plate 322 on the drill pipe through the pulley arrangement. The cable 335 of the block and tackle, which includes the block 321, extends to a reel or drum 336 driven by the air engine 20 of Figure 1 that receives its air from the compressor unit 1 of Figure 1, through a controller such as shown at 15 of Figure 1. The drum 336 is driven by the engine to raise or lower the pipe 311 in the manner known in the art. The speed of the drum is controlled by the controller 15 in the manner previously described. During the actual drilling operations there is no hoisting.

If an unloader of one of the small compressor cylinders 2 is released that compressor will start to build up a pressure in the high pressure main so that the pistons of the engine 20 will apply a torque tending to turn the drum 336 and raise the block 321. As this torque increases it progressively exerts a greater and greater upward pull on the pipe 311 through the plate 322, thus progressively reducing the weight or pressure of the bottom of the drill bit in the bore drilled thereby. Since the total length of the drill pipe 311 is known the weight thereof is also known. The pressure of the drill is, therefore, the difference between the known weight of the drill pipe and the upward pull exerted thereon by the air engine, as indicated by the pointer 328 on the scale 331. If it is desired to maintain constant the weight of the drill bit in the bore it is merely necessary to maintain the pointer 328 in a constant position over the scale 331, this being maintained by maintaining a constant pull on the cable 335 by the air engine. The constant pull is maintained by maintaining a constant pressure in the high pressure main. When the pressure in the high pressure main reaches the desired constant value, as indicated by the pointer 328 reaching its desired position on the scale 331, the unloader of the compressor cylinder that was operating must be actuated, to stop a further rise in pressure in the high pressure main. A relay is provided for automatically accomplishing this result, and for recommencing the operation of the compressor if the pressure falls below the set value.

The constant pressure regulating relay is shown in Figures 38 and 39, the connections of that relay being shown in Figure 1. This relay is connected to the first tube 16 at the controller by turning the three-way valve 285 through 90° in a clockwise direction from the position illustrated in Figures 1 and 26. The relay consists of a cylinder 340 which is connected to the high pressure main and balances the pressure of the high pressure main on one side of the piston 341 against a compression spring 342 whose tension is adjustable by a cap screw 343 threaded into the cylinder 340. The piston 341 actuates a piston rod 344 that carries three pistons 345, 346 and 347 in a cylinder 348. The space in the cylinder 348 between the pistons 346 and 347 receives air from the low pressure main via a tube 350 that is adapted to discharge through a tube 351 under control of the piston 347. If the pressure in the high pressure main becomes too low, as due to leakage of air, the spring 342 forces the piston 341 upwardly thereby opening the tube 351 to atmosphere at the cylinder 348. This atmospheric pressure is conveyed via the tube 351, the three-way valve 285 (Figs. 1 and 26) and the tube 16 that leads to the unloader valve of one of the small compressor cylinders. This releases the unloader valve of that particular engine cylinder by removing the pressure from that unloader. That cylinder therefore commences to force air into the high pressure main to build up the pressure therein. As the pressure builds up, the piston 341 moves downwardly. When the pressure reaches the desired value the piston 341 has moved downwardly an amount just sufficient to apply low pressure from the low pressure line 350 through the cylinder 348 to the tube 351, thence through the valve 285 to the right hand end line 16 of Figures 1 and 26, thereby energizing the particular unloader valve and stopping a further building up of the pressure in the high pressure main. Should the pressure in the high pressure main become excessive then the piston 341 will move downwardly against the action of the spring 342 with the result that the piston 346 will uncover the opening to a line 355 which establishes communication between a line 356 leading from the high pressure main and a line 355 that leads to the low pressure main. This will bleed off the excess pressure from the high pressure main. Thus the relay of Figure 38 will constantly regulate to maintain a pressure in the high pressure main necessary to maintain the piston 341 balanced against the spring 342 as set by the screw 343. The pressure of the drill bit in the bore is thus maintained constant.

As the length of pipe line 311 is increased it is necessary to increase the pressure in the high pressure main in order that the remaining pressure of the drill bit shall remain constant. To increase the pressure in the high pressure main it is merely necessary to adjust the screw 343 to increase the compression of the spring 342. This momentarily causes the piston 341 to rise and, through the piston rod 344, to close off the application of pressure from the low pressure main 356 to the tube 351 and expose that tube to atomspheric pressure thus releasing the unloader of the compressor controlled thereby so that the pressure commences to build up and is then maintained at a new value required to maintain the piston 341 in the position illustrated in Figure 38, when balanced against the higher spring pressure.

When it is desired to raise the pipe 311 it is necessary to slip the belt 313 to the idler pulley on the shaft and thus discontinue the rotation of the pipe 311. Thereafter the hand operated valve controlling the application of pressure to the relay 38 is closed and the three-way valve 285 is set to the position illustrated in Figure 26. This closes off the connection between the first tube 16 and the tube 351 leading to the constant pressure relay and instead connects the first tube 16 to the controller 15 so that the unloader of the particular cylinder connected to the first tube 16 is now controlled by the controller 15. The controller may then be used in a manner previously described to hoist the load at the desired speed.

When the hand lever is at the neutral position or to the left thereof none of the compressor cylinders 2—2 are delivering air to the high pressure main because all of the compressor unloaders are actuated. Also, when the lever is to the left of the neutral position the brake control cylinder permits air flow from the high pressure main to the low pressure main. This mode of operation is utilized for braking.

When it is desired to lower the pipe line the air engine 20 may be used as a brake to brake the descent of the line. This is accomplished in the following manner: The hand operated lever 253 is shifted in the cross slot 257 to set the engine valves for the corresponding direction of rotation. Shifting of the hand lever 253 in the slot 257 is of no effect on the operation of the unloaders because the gear sector 260 merely slides lengthwise on the pinion 261. This shifting of the lever, however, shifts the pistons 265—266 of the direction pilot valve 268 to the right from the position illustrated in Figure 27 and applies the pressure from the high pressure main to the tube 23, thus positioning the reversing cylinder 181 of Figure 20 in the manner previously described, to set the eccentrics that control the mechanical valves of the engine 20 for the proper direction of rotation. The load now commences to drive the engine 20 as a compressor. The controller handle is shifted to the position illustrated in Figure 30. The engine 20 builds up pressure in the high pressure main until the pressure in the high pressure main becomes sufficient to counterbalance the torque of the load, at which time the load comes to rest. In the position of the controller handle illustrated in Figure 30, the maximum braking effect is obtained. If it is desired to obtain a smaller amount of braking effect the handle 253 is moved back, that is, to the left from the position illustrated in Figure 30. This immediately causes the piston 291 to move downwardly and establish communication between the lines 292 which is connected to the high pressure main and the line 293 which is connected to the low pressure main. Air immediately commences to flow from the high pressure main to the low pressure main, thus tending to relieve the pressure in the high pressure main and permitting a further descent of the load. The rate of air flow from the high pressure air main to the low pressure air main will determine the rate at which the compressed air engine 20, now operating as a compressor, will rotate, and thus will determine the rate of descent of the load. As the hand lever 253 is moved further and further to the left, from the position illustrated in Figure 30, it uncovers progressively larger port areas in the cylinder 290 communicating with the line 293, thus progressively increasing the rate of air transfer from the high pressure main to the low pressure main and thereby permitting greater descending speeds of the load or, stated in other words, reducing the braking effect.

Movement of the controller to the right of the braking position, either in the slot 255 or the slot 256, produces a progressively faster driving effect. Thus during hoisting operations, if the controller handle is moved from the hoisting position to the position illustrated, the load will come to rest due to the gravitational decelerating effect and then, without shifing of the lever in the slot 257, it would tend to reverse its direction of rotation. As soon as the direction of rotation changes the hoisting engine commences to operate as a compressor, builds up pressure in the high pressure main and brings the load to rest when the pressure in the high pressure main has reached a value equal to the torque of the load. It is possible to control the deceleration of the load at will by controlling the lever 253, either by moving the lever toward the slot 257, or across the slot to set the engine valve cams for reverse direction, or in one or the other of the two slots 255—256 to cause the engine driven compressor to build up pressure in the high pressure main to drive the load in the opposite direction.

In the case of a load, such as a train of cars running on a level track, the retarding force is not a constant like the force of gravity but decreases as the speed decreases until it finally reaches zero at zero train speed and then does not reverse its direction of travel as in the case of a weight being hoisted. Because of these conditions, the braking action in the case of a locomotive is obtained by reversing the valve gear of the air engine, thereby changing the functions of the air engine to an air compressor. In the case of a hoisting load the mere change of the direction of travel of the load, due to the action of gravity, causes the engine 20 to commerce to operate as a compressor.

The principles of the present invention can be applied to a power system which affords regenerative braking. Such a system is illustrated in Figure 40. In this figure a low pressure main is indicated at 360. The pressure in this main is maintained at a constant value of, say, 100 pounds per square inch absolute by an auxiliary compressor 361. A constant speed electric motor 362 drives a compressor unit 363 that receives air from the low pressure main 360 and discharges into a high pressure main 364. A power unit 20, of the same construction as the unit 20 of Figure 1, receives air from the high pressure main and discharges into the low pressure main, said unit 20 operating in the same manner as does the unit 20 of Figure 1, and including a governing and reversing device 22 which receives air from the high pressure main through a direction controlling pilot valve 268, of the same construction as the pilot valve 268 of Figure 27. The shaft 252 of the direction controlling pilot valve 268 is manually operated by a hand lever 366 independent of the controller handle. The engine unit 363 is of a construction substantially identical with that of the unit 20, differing therefrom only in that pneumatically controlled unloader valves and pneumatically controlled auxiliary valves are provided for a purpose to be more fully set forth as this description proceeds. It is sufficient here to state that when the load is being driven the unit 363 operates as a compressor driven by the electric motor 362 to supply pressure to the high pressure main 364 and that during regenerative braking the unit 363 acts as a motor, driven by pressure in the high pressure main to drive the dynamo electric machine 362 as a generator to supply electric energy to the electric line connected to the machine 362.

The unit 363 always rotates in the same direction but is provided with a valve gear reversing device 22 of exactly the same construction as that of the unit 20 which, when set in one direction, causes the unit 363 to operate as a motor, and when set in the other direction causes it to operate as a compressor. The governing and reversing device 22 is controlled by a direction controlling pilot valve 268' like the direction controlling pilot valve 268 of Figure 27. The direction controlling piston rod shaft 252 of this pilot valve is controlled by a hand operated lever 366'.

The system of Figure 40 includes also a controller 15' similar to the controller 15 of Figure 27. The controller has a neutral position from which it is movable in one direction to actuate the brake cylinder 290 in a manner illustrated in Figure 30, and is movable in the opposite direction to progressively release pressure from fourteen pilot valves 283 similar to the pilot valves 283 of the controller of Figure 26. When the pressure is applied to the pilot valves 283 it is transmitted through the respective tubes 16a to unloaders and pneumatic valves of the engine 363.

The pneumatically controlled valves of the engine 363 are illustrated in Figures 41, 42 and 43. In Figure 41 the high pressure header is indicated at 44 and the low pressure header at 46, said headers being connected respectively through pipes 43 and 45 to the high pressure valve head 41 and the low pressure valve head 42 of one of the engine cylinders in the same manner as in the engine 20, as illustrated in Figures 2, 5 and 6, except that a pneumatically operated valve 370 is interposed between the high pressure header 44 and the pipe 43. The valve 370, illustrated more fully in Figure 42, is maintained normally open by a compression spring 371 and is adapted to be moved to a closed position by the application of pressure to a cylinder 372, which pressure acts on a piston 373 to close the valve. Once the pressure is released in the cylinder 372 the valve automatically opens under action of the spring 371. Pressure is applied to the cylinder 372 by way of a tube 374 which connects to the tube 16a. When the pressure in the tube 16a that leads to the cylinder illustrated in Figures 41 and 42 is reduced to atmospheric pressure, the spring 371 opens the valve 370 and permits direct communication or air flow from the header 44 to the pipe 43.

Each working cylinder of this engine is provided with mechanically operated high pressure and low pressure valves and with automatically operated high pressure and low pressure valves the same as the engine of Figure 2, and operated in the same manner. In addition the automatically operated low pressure valve of the engine cylinder 31 is provided with an unloader 375 which may be of any desired construction as, for instance, one such as shown in Marks' Mechanical Engineers Handbook, third edition, page 1873. As previously stated, the automatic valve consists of one or more rings or discs seated by a light spring and arranged to open when the pressure in the cylinder 31 drops slightly below the pressure in the low pressure main or low pressure valve head. The unloading device is arranged to maintain the automatic valve open mechanically, and consists of a piston 376 pressed upwardly by a spring 377 to its inoperative position and moved downwardly by pressure as applied through a tube 379. When the pressure moves the piston downwardly against the action of the spring 377 the piston moves a prong or group of prongs into engagement with the spring seated automatic valve and holds it in its open position.

The tube 379 is connected to the tube 16a, as shown in Figure 41, that leads from the particular cylinder of the engine, to the controller 15'. Thus when the controller 15' is set so that atmospheric pressure is applied to a particular tube 16a the valve 370 of the corresponding engine cylinder is maintained open by its spring 371 and the unloader 375 on the low pressure side of that cylinder is maintained inoperative by spring 377. That cylinder of the engine then operates as a compressor cylinder. If it is desired to disable that cylinder the controller 15' is moved to a position to apply pressure to a corresponding tube 16a. This pressure automatically causes the valve 370 to close, thereby closing off communication between the corresponding cylinder 31 and the high pressure header 44. At the same time the unloader valve 375 holds open the automatic valve controlling communication between the low pressure main and the cylinder 31 so that the cylinder 31 merely idles.

A description will now be given of the mode of operation of the system of Figure 40. The electric motor 362 is operating at a constant speed. Assume that it is desired to operate the unit 20 as a motor. The controller handle 253 is moved to progressively release the pressure on the different pilot valves 283 thereby progressively releasing pressure from successive tubes 16a and releasing the unloaders 375 of the cylinders. This permits the automatic valves on the low pressure side of those cylinders to function. At the same time the release of pressure from the line 16a causes the valve 370 of the corresponding cylinder to open and remain open. The cylinder then operates as a compressor under the action of the automatic valves and takes air from the low pressure main 360 and delivers it to the high pressure main 364. At that time the opening and shutting of the mechanical valves of the unit 363 as controlled by the governor 22 is of no effect because the automatic valves of that unit open in advance of the mechanical valves. The unit 363 thus acts as a compressor delivering air to the high pressure main to operate the unit 20. It is thus apparent that during normal operation, while the engine 20 is driving the load, the operation is the same as that of the system of Figure 1, the controller 15' determining the number of cylinders of the unit 363 that are in service, thus determining the rate of air delivery to the high pressure main, which in turn determines the speed of operation of the engine 20. The hand lever 366 controls the reversing pilot valve 268 to determine the direction of rotation of the engine 20. Therefore it is not necessary to have the two slots 255—256 of Figure 32.

For non-regenerative braking action the controller is brought to the neutral position which will give the maximum braking effect and may then be moved backward from that position to control the braking cylinder 290 in the manner previously described, to produce a diminishing braking action. To effect this braking action the hand lever 366 may or may not be moved to reverse the valve gear of the engine 20, depending upon the type of load involved, as in the system of Figure 1 as previously described.

An explanation will now be given of the manner of operation of the system of Figure 40 for regenerative braking. This braking may be of either of two types, namely, the regenerative braking necessary to prevent or control acceleration of a load as, for instance, a train of cars on a decline, or to effect a deceleration of a load as, for instance, a train of cars on level ground. During regenerative braking the unit 363 must operate in the same direction as before, but now it must drive the machine 362 as a generator instead of being driven by that machine as a motor. The unit 363 must therefore act as a motor during regenerative braking whereas previously it acted as a compressor. To permit the unit to act as a motor it is necessary to reverse the valve gear thereof. This is done by actuating the reversing pilot valve 268' by the handle 366'. The unit 363 may now act as a motor. The reversing valve handle 366 that controls the unit 20 is then set to cause that unit to act as a compressor, rather than as a motor. The handles 366 and 366' are actuated while the controller 15' is temporarily moved to its fully brake released position. The controller 15' is then brought back to a position corresponding to the position of the then speed of the load. As the load accelerates, or tends to accelerate, it forces more and more air into the high pressure main, which air is taken from the main by the unit 363 operating as a motor. If the train should accelerate notwithstanding this braking action, one of two things will happen. Either the pressure will build up to the maximum value as determined by the safety valve 13 and then bleed from the high pressure main to the low pressure main through the safety valve or, as the pressure builds up and the braking effect increases the train will decelerate to a new speed as determined by the permitted rate of air out flow through the unit 363. If the pressure builds up to more than 600 pounds per square inch absolute, which is the assumed setting of the safety valve, it is desirable to set the controller to release more of the unloaders of the unit 363 to take more air from the high pressure main thus increasing the regenerative action and avoiding wastage of energy by the transfer of air through the safety valve. More cylinders of the unit 363 can be brought into action by shifting the hand lever of the controller 15' to actuate more of the pilot valves 282 to release more of the unloader valves 375. If the rate of air consumption by the unit 363 as determined by the number of its released unloader valves is greater than the rate of air delivery by the unit 20 to the high pressure main, the pressure in that main will tend to drop, permitting an acceleration of the train to increase the rate of air delivery to the high pressure main until an equilibrium point is reached which will then determine the amount of regenerative braking present. On the other hand, if the rate of air consumption by the unit 363 is less than the rate of air delivery to the high pressure main by the unit 20, the pressure will tend to rise which will automatically increase the regenerative braking effort and decelerate the train to a new speed, at which the rate of air delivery by the unit 20 to the high pressure main exactly equals the rate of air consumption by the high pressure main.

Assume now that a load, such as a train, is operating at a level track and it is desired to use the regenerative braking to decelerate or stop the train. The handle of the controller 15' is temporarily moved to the end position where the brake release piston 291 is fully depressed. The reversing cylinders 268—268' are reversed, and then the controller is brought back to a position the same as the position it previously occupied. In that position of the controller the slightest deceleration of the train will cause its engine 20 to deliver less air to the unit 363 and thus the braking effect would be less. The controller is then moved back one step to reduce the number of cylinders of the engine 363 in service. This causes the unit 363 to take less air than is delivered to the high pressure main by the engine 20, with a result that the pressure in the main 364 tends to rise and therefore this pressure drives the unit 363 as a motor to drive the motor 362 as a generator for regenerative braking. As this regenerative braking continues the train decelerates until ultimately it reaches a speed equal to the speed set for it by the controller 15'. At this time all of the air supplied by the unit 20 flows to the unit 363 to operate it for regenerative braking. As the train decelerates further and decreases the rate of air supplied to the main 360, without a corresponding decrease in the rate of air consumption by the unit 363, the pressure in the main 360 commences to drop thus reducing the braking effort. The controller 15' is then moved back one step to decrease the number of cylinders of the unit 363 taking air from the main 360, which again causes the pressure in the main 360 to rise. This action is continued, the controller 15' being progressively moved back towards the neutral position as the train continues to decelerate.

From the above description it is apparent that the system of Figure 40 may be used for regenerative braking of other types of loads such as, for instance, a hoist.

In the power systems thus far described the maximum and minimum design pressure limits are so chosen that the maximum temperatures are limited. With an initial outside air temperature of 60° F. and a pressure range from 100 pounds per square inch absolute to 600 pounds per square inch absolute the temperature range, under adiabatic conditions, will be from 60° F. to 410° F. If desired the system may be designed to operate at a pressure cycle from 300 pounds per square inch absolute in the low pressure main to 600 pounds per square inch absolute in the high pressure main. With such a pressure range the temperature range during adiabatic compression and during adiabatic expansion, assuming an initial air temperature of 100° F., will be between 100° F. and 220° F. This is an appreciably lower temperature range than obtained when operating through a pressure cycle between 100 pounds per square inch absolute and 600 pounds per square inch absolute. Therefore, when operating between 300 pounds per square inch absolute and 600 pounds per square inch absolute it is possible to add heat from an external source to raise the temperature of the air in the high pressure main another 190° before a temperature of 410° F. is reached. An increase in temperature from 220° F. to 410° F. is the same as an increase from 680° F. absolute to 870° F. absolute. Assuming that, while heat is added from the external source, the pressure is unchanged by permitting an increase in volume, the volume will be increased by this heat addition in the ratio of 68 to 87. Hence, if this system of heating be used in addition to the compression from 300 pounds per square inch absolute to 600 pounds per square inch absolute, the capacity of the air compressor unit can be reduced in the same ratio, or can be reduced to 78% of the capacity that is required where heat from an external source is not added. Against the saving in capacity of the air compressor unit there must be debited the cost of equipment for raising the air temperature after compression and equipment for cooling the air temperature to 100° F. after it has been expanded in the compressed air engine.

While the above description has been directed to a system operated between a variable high pressure and a fixed low pressure, it is possible to operate the system between a fixed high pressure of 600 pounds per square inch and a fixed low pressure of, say, 100 pounds per square inch, or 300 pounds per square inch, as pointed out above. In a system designed to operate between fixed upper and lower pressures the power output of the engine is changed by changing the point of admission cut-off. The exhaust valve of the engine would then consist of an ordinary flutter valve which would open as soon as the air in the engine cylinder has been expanded to the fixed minimum value, namely, the pressure in the low pressure main.

As an alternative to either of the above arrangements it is possible to operate the system of Figure 1 between a fixed high pressure of, say, 600 pounds per square inch and a variable low pressure. Under those conditions the high pressure main would be of a comparatively high volumetric capacity and the low pressure main would be of a comparatively small volumetric capacity. The admission valves of the engine of Figure 2 would be operated to give a cut-off at 24%, which is the cut-off at 600 pounds as determined from Figure 7. By changing the point of opening of the exhaust valves it is possible to get the desired low pressure range. Under such circumstances the constant pressure maintaining apparatus of the auxiliary compressor 10 of Figure 1 would be omitted. Since the volumetric capacity of the low pressure main would be made very small the pressure in the low pressure main would be determined by the point of opening of the exhaust valves. If, for instance, the exhaust valve is opened after the gas in the cylinder has been expanded from 600 pounds to only 500 pounds, the remaining energy of the gas would not be lost because the pressure in the low pressure main would quickly rise to 500 pounds and thus reduce the amount of work required of the compressor unit to raise the pressure to 600 pounds.

In the description of the system illustrated in Figure 40 it was shown that air under pressure can be transmitted from the unit 363 to the unit 20 in variable amounts and that by proper setting of the reversing devises air can be delivered by the unit 20 to the unit 363 in variable amounts and that each one of the units 363 and 20 can operate either as a compressor when it is mechanically driven, or as a motor when it receives air under pressure. The load 21 can be replaced by a source of power to drive the shaft 33, operating the unit 20 as a compressor to deliver air to the unit 363 operating as a motor to drive a load. If the unit 20 is driven at a constant speed the amount of air delivered thereby into the high pressure main is constant. The speed of the unit 363, as previously described, will be determined by the number of its cylinders in service as determined by the position of the handle on the controller 15'. It has previously been pointed out how the handle of the controller 15' may be manipulated to give a constant speed for the unit 363 at a variable air intake. The controller 15' may also be manipulated to give a variable speed of operation of the unit 363 when the amount of air supplied thereto by the unit 20 is constant. Assume that the unit 20 is driven at a constant speed, delivering a constant amount of air to the high pressure main, and the unit 363 is driving a load which may be operated at different speeds such as, for instance, a hoist, or a locomotive load. Under such circumstances when the controller 15' is set to release the unloader valve of only one cylinder of the unit 363 the amount of air taken by the unit per revolution of its crank shaft is small, hence the pressure in the main 364 will build up thereby increasing the speed of the unit 363 until its speed is such that the rate at which it withdraws air from the main 364 equals the rate at which air is delivered to that main by the unit 20. If the controller is then set to release the unloader valves of two cylinders the unit 363 will thereupon commence to take twice as much air per revolution thereof and the pressure in the main 364 will therefore commence to drop, thereby dropping the speed of the unit 363 until new equilibrium conditions are reached, at half the speed that prevailed when only one cylinder is in service. Thus, progressively increasing the number of cylinders of the unit 363 that are in service will progressively decrease the speed of the unit 363, in a manner which is apparent from the description previously given. From the above description it may be seen that in a system employing two units such as the unit 363 and the unit 20, either unit may be driven at a constant speed to drive a load at a variable speed, and that the variations in the speed of the load may be obtained by releasing unloader valves on the unit that is acting as a motor or on the unit that is acting as a compressor.

The relationships of the speeds of the units 20 and 363 may be expressed mathematically as follows: Assume that $S_1$ and $S_2$ are the speeds of the units 363 and 20, respectively, and that $N_1$ and $N_2$ are the number of cylinders in service in the units 363 and 20, respectively. The product of $S_1$ and $N_1$ bears a direct relationship to the amount of air flowing through the macnine 363 and the product of $S_2$ and $N_2$ bears a direct relationship to the amount of air flowing through the machine 20. Since the amount of air flowing through the two machines is the same, it follows that the product of $S_1$ and $N_1$ is directly proportionate to the product of $S_2$ and $N_2$. The following equation may therefore be written:

$$S_1 N_1 = k S_2 N_2$$

in which $k$ is a constant. Therefore $$S_1 = k \frac{S_2 N_2}{N_1}$$

or $$S_2 = k \frac{S_1 N_1}{N_2}$$

It is therefore apparent that the speed of either machine can be controlled either by controlling the speed of the other machine or by controlling the number of cylinders in operation on either or both of the machines. The number of cylinders in operation in either one of the machines may be held constant and the ratio $$\frac{N_1}{N_2}$$

changed by actuating or releasing more or less of the unloaders of the other machine.

It is apparent that the principles of the present invention are of wide applicability and are particularly suited to the power requirements for the draw works of an oil well drilling rig or for the requirements for driving a vehicle such as, for instance, a train of cars, an automobile, or seacraft. In the case of a unit used for driving an automobile the present system dispenses with the usual clutch, speed changing gears, reversing gears, and foot brake.

As previously pointed out the air circuit of the present system is a closed circuit, the same air circulating over and over again through the high pressure main, the motor, the low pressure main, and the compressor, back to the high pressure main. The medium "air" is used because that is the most readily available gas. However, a different gas may be used if desired, in which case the auxiliary compressor 10 would take gas not from the atmosphere but from a suitably provided source. As previously pointed out, when operating at a low pressure of 100 pounds per square inch absolute the rise in temperature of the gas during compression limits the upper pressure to 600 pounds per square inch. With a gas other than air different upper limits may be utilized. It is therefore to be understood that other gases which can be compressed and expanded while remaining in their gaseous stage at the pressures and temperatures involved may be used as the equivalent of air in the system illustrated and claimed.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A power transmission including a high pressure air main, a low pressure air main, an air engine receiving air from the high pressure main and discharging into the low pressure main, an air compressor receiving air from the low pressure main and discharging into the high pressure main, means for maintaining the pressure in one of the mains constant and the pressure in both mains above atmospheric pressure whereby the engine operates between upper and lower pressures both above atmospheric pressure, said mains and compressor and engine forming a closed air system, and means for varying the pressure in the other main to vary the engine torque.

2. A power transmission including a high pressure air main, a low pressure air main, an air engine receiving air from the high pressure main and discharging into the low pressure main, an air compressor receiving air from the low pressure main and discharging into the high pressure main, means for maintaining the pressure in the low pressure main above atmospheric pressure whereby the engine operates between upper and lower pressures both above atmospheric pressure, said mains and compressor and engine forming a closed air system, means for varying the pressure in one of the mains to vary the engine torque, and means responsive to the pressure in said one main for regulating the engine valves in such relationship to the pressure in the high pressure main that the air in the engine cylinder during the compression stroke will have been compressed to the pressure of the high pressure main at the commencement of the opening of the intake valve.

3. A power transmission including a high pressure air main, a low pressure air main above atmospheric pressure, a reciprocating air engine having intake and exhaust valves receiving air from the high pressure main and discharging into the low pressure main, an air compressor receiving air from the low pressure main and discharging into the high pressure main, means for maintaining the pressure in one of the mains constant, means for altering the pressure in the other main, whereby the engine operates between a fixed and a variable pressure both above atmospheric pressure, means controlled by the pressure in the variable pressure main for regulating the termination of the engine exhaust in such relationship to the pressure in the variable pressure main that the air in the engine cylinder during the remainder of the exhaust stroke will have been compressed to the pressure of the high pressure main at the commencement of opening of the intake valve.

4. A power transmission system including a compressor unit, load driving means comprising an air engine of the type capable of operating also as a compressor, a high pressure main connecting the high pressure sides of the compressor and the engine, means for disabling the compressor unit when the engine is operating as a compressor to brake the load, throttling means to vary the pressure in the high pressure main, and manually operated brake regulating means for variably positioning the throttling means for variably discharging air from the high pressure main and thereby varying the pressure in the high pressure main and the braking effect of the engine on the load.

5. A power transmission system including a compressor unit, an air engine of the type capable of operating also as a compressor, a high pressure main connecting the high pressure sides of the compressor and the engine and a low pressure main connecting the low pressure sides of the compressor and the engine to constitute a closed air system, means for maintaining the pressure in the low pressure main substantially above atmospheric pressure, a controllable by-pass between the two mains, throttling means to vary the pressure in the high pressure main, and manually operated means for variably positioning the throttling means for variably opening the by-pass between the two mains to vary the pressure in the high pressure main and thereby vary the braking effect of the engine on the load.

6. A power transmission system including a compressor unit, an air engine of the type capable of operating also as a compressor, a high pressure main connecting the high pressure sides of the compressor and the engine and a low pressure main connecting the low pressure sides of the compressor and the engine to constitute a closed air system, and a controllable by-pass between the two mains, means for disabling the compressor unit when the engine is operating as a compressor, throttling means to vary the pressure in the high pressure main, and manually operated means for variably positioning the throttling means for variably opening the by-pass between the two mains and thus to vary the pressure in the high pressure main thereby varying the braking effect of the engine on the load.

7. A power transmission including a high pressure air main, an air compressor unit discharging into the high pressure main, an air motor receiving air from the high pressure main at substantially the same rate as the rate of output of the compressor unit, at least the compressor unit including a plurality of cylinders, and manually operated means for changing the speed of the motor in relation to the speed of the compressor unit independently of the torque required of the motor, said means including means on a stationary portion of the said compressor unit for selectively disabling the cylinders thereof to alter the relationship of its speed to the speed of the motor and thereby increasing the maximum torque available to the motor.

8. In combination, a first air engine, a second air engine, a high pressure main connecting the high pressure sides of the two engines, each of said engines being of the type capable of operating by air pressure as a motor and operating as a compressor when mechanically driven, means coupled to the first engine to drive it as a compressor and to be driven by it when the said first engine operates as an air motor, said first engine having valve gear, means for reversing the valve gear to change said first engine from motoring to compressing while retaining the same direction of rotation, at least the first one of said engines comprising a multicylinder engine having manually operated means for changing the speed of the motor in relation to the speed of the compressor independently of the torque required of the motor, said means including means on a stationary portion thereof for selectively disabling the cylinders of the compressor unit to alter the relationship of its speed to the speed of the motor and thereby increasing the maximum torque available to the motor.

9. A power transmission including a closed circuit having a high pressure air main and a low pressure air main and means for maintaining the pressure in the entire circuit above atmospheric pressure, a multi-cylinder reciprocating air engine receiving air from the first main and discharging into the second main, said engine including mechanically operated intake and exhaust valves and having also means for maintaining the pressure within the engine cylinder between maximum and minimum limits substantially equal to the pressure in the respective mains.

10. A power transmission including a closed circuit having a high pressure air main and a low pressure air main and means for maintaining the pressure in the entire circuit above atmospheric pressure, a multi-cylinder reciprocating air engine receiving air from the first main and discharging into the second main, said engine including mechanically operated intake and exhaust valves and having also means for maintaining the pressure within the engine cylinder between maximum and minimum limits substantially equal to the pressure in the respective mains, said means comprising valves paralleling the mechanical valves and operated by the differences between the pressure in the cylinder and in the respective mains.

11. A power transmission including a closed system having high and low pressure air mains and means for maintaining the pressure in the entire circuit above atmospheric pressure and a multi-cylinder reciprocating engine receiving air from the high pressure main and discharging into the low pressure main, means responsive to a rise of pressure in the engine above that of the high pressure main for opening an air flow path between the engine cylinder and the high pressure main, and means responsive to a drop in pressure in the engine cylinder below that of the low pressure main for opening an air flow path between the engine cylinder and the low pressure main.

12. A power transmission including high and low pressure air mains and a reciprocating engine receiving air from the high pressure main and discharging into the low pressure main, means responsive to a rise of pressure in the engine above that of the high pressure main for opening an air flow path between the engine cylinder and the high pressure main, means mechanically operated by the engine piston for controlling the engine cut-off, means responsive to a drop in pressure in the engine cylinder below that of the low pressure main for opening an air flow path between the engine cylinder and the low pressure main, and additional means mechanically operated by the engine piston for controlling the termination of the engine exhaust action.

13. A power transmission including high and low pressure air mains and a reciprocating engine receiving air from the high pressure main and discharging into the low pressure main, means for varying the pressure in one of the mains to vary the engine output, means responsive to a rise of pressure in the engine above that of the high pressure main for opening an air flow path between the engine cylinder and the high pressure main, and means responsive to a drop in pressure in the engine cylinder below that of the low pressure main for opening an air flow path between the engine cylinder and the low pressure main.

14. A power transmission including high and low pressure air mains and a reciprocating engine receiving air from the high pressure main and discharging into the low pressure main, means for varying the pressure in one of the mains to vary the engine output, means responsive to a rise of pressure in the engine above that of the high pressure main for opening an air flow path between the engine cylinder and the high pressure main, mechanically operated means controlled by the engine piston for controlling the engine cut-off, means responsive to a drop in pressure in the engine cylinder below that of the low pressure main for opening an air flow path between the engine cylinder and the low pressure main, and additional mechanical means controlled by the engine piston for controlling the termination of the engine exhaust action.

ALLEN M. ROSSMAN.

REFERENCES CITED

The following references are of record in the file of this patent:

UNITED STATES PATENTS

| Number | Name | Date |
|---|---|---|
| 277,795 | Shone | May 15, 1883 |
| 767,027 | Wilkinson | Aug. 9, 1904 |
| 1,017,835 | Wilkinson | Feb. 20, 1912 |
| 1,116,346 | Macfarren | Nov. 3, 1914 |
| 1,374,154 | Mueller | Apr. 5, 1921 |
| 1,738,121 | Schramm | Dec. 17, 1929 |

(Other references on following page)

UNITED STATES PATENTS

| Number | Name | Date |
|---|---|---|
| 1,774,293 | Schottelius | Aug. 26, 1930 |
| 1,804,873 | Hoffmann | May 12, 1931 |
| 1,828,956 | Bruckner | Oct. 27, 1931 |
| 1,829,261 | Bruckner | Oct. 27, 1931 |
| 1,907,326 | Lamley | May 2, 1933 |
| 2,049,078 | Otis | July 28, 1936 |
| 2,074,618 | Roeder | Mar. 23, 1937 |
| 2,120,546 | Burt | June 14, 1938 |
| 2,123,306 | Hood | July 12, 1938 |
| 2,171,672 | Plummer | Sept. 5, 1939 |
| 2,210,328 | Reidinger | Aug. 6, 1940 |
| 2,219,967 | Thiry | Oct. 29, 1940 |
| 2,225,518 | Blasig | Dec. 17, 1940 |
| 2,258,001 | Chamberlain | Oct. 7, 1941 |
| 2,274,339 | Loomis | Feb. 24, 1942 |
| 2,298,222 | McShane | Oct. 6, 1942 |

FOREIGN PATENTS

| Number | Country | Date |
|---|---|---|
| 514 | Great Britain | Jan. 8, 1910 |